United States Patent
Tsukamoto

(10) Patent No.: US 7,949,230 B2
(45) Date of Patent: May 24, 2011

(54) ELECTRONIC EQUIPMENT, SYSTEM FOR VIDEO CONTENT, AND DISPLAY METHOD

(75) Inventor: Junichi Tsukamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 1196 days.

(21) Appl. No.: 11/491,833

(22) Filed: Jul. 24, 2006

(65) Prior Publication Data

US 2007/0097269 A1    May 3, 2007

(30) Foreign Application Priority Data

Jul. 26, 2005 (JP) ................................. 2005-215395

(51) Int. Cl.
*H04N 5/93* (2006.01)
*H04N 5/92* (2006.01)

(52) U.S. Cl. ........................................ 386/282; 386/326

(58) Field of Classification Search .................... 386/46, 386/83, 92, 124; 725/37, 38, 141; 348/734, 348/14.05
See application file for complete search history.

(56) References Cited

U.S. PATENT DOCUMENTS

| | | | |
|---|---|---|---|
| 2001/0007455 A1* | 7/2001 | Yoo et al. ....................... | 345/856 |
| 2006/0107234 A1* | 5/2006 | Tudor et al. .................... | 715/821 |
| 2006/0236338 A1* | 10/2006 | Shimoda ......................... | 725/37 |

FOREIGN PATENT DOCUMENTS

| | | |
|---|---|---|
| JP | 5 333838 | 12/1993 |
| JP | 6 202834 | 7/1994 |
| JP | 8 65764 | 3/1996 |
| JP | 2002 501240 | 1/2002 |
| JP | 2002 315072 | 10/2002 |

* cited by examiner

*Primary Examiner* — Robert Chevalier

(74) *Attorney, Agent, or Firm* — Frommer Lawrence & Haug LLP; William S. Frommer; Thomas F. Presson

(57) ABSTRACT

An electronic equipment device that includes a storage section storing data for creating a menu screen. A metadata acquisition section acquires metadata for displaying a menu item for operating external equipment, from the external equipment. The metadata having data for defining a type of the menu item and transition of a menu focus. A remote commander operation detection section detects operation performed on a remote commander. A menu screen generation processing section adds the menu item based on the metadata to the menu screen, for assembly; and a notification processing section notifies the external equipment of the menu item selected on the menu screen.

8 Claims, 32 Drawing Sheets

FIG. 7

```xml
<BUTTON Origin="0,160" Size="200,80" Enabled="True"
  Visible="True" Selected="False">
    <CAPTION>SCHEDULE LIST</CAPTION>
    <ID>2</ID>
    <TRANSITION>
        <MOVE Left="-1" Right="-1" Up="1" Down="3" />
        <ENTER OK="-1" Back="-1" Menu="-1" />
    </TRANSITION>
    <EVENT>
        <MOVE Left="-1" Right="-1" Up="-1" Down="-1" />
        <ENTER OK="266" Back="-1" Menu="-1" />
    </EVENT>
    <HELP>SCHEDULE LIST WILL BE DISPLAYED</HELP>
</BUTTON>
```
⎫D3

```xml
<BUTTON Origin="0,240" Size="200,80" Enabled="False"
  Visible="True" Selected="False">
    <CAPTION>DUBBING</CAPTION>
    <ID>3</ID>
    <TRANSITION>
        <MOVE Left="-1" Right="-1" Up="2" Down="4" />
        <ENTER OK="-1" Back="-1" Menu="-1" />
    </TRANSITION>
    <EVENT>
        <MOVE Left="-1" Right="-1" Up="-1" Down="-1" />
        <ENTER OK="267" Back="-1" Menu="-1" />
    </EVENT>
    <HELP>DUBBING WILL BE PERFORMED</HELP>
</BUTTON>
```
⎫D4

```xml
<BUTTON Origin="0,300" Size="200,80" Enabled="False"
  Visible="True" Selected="False">
    <CAPTION>SETTING</CAPTION>
    <ID>4</ID>
    <TRANSITION>
        <MOVE Left="-1" Right="-1" Up="3" Down="-1" />
        <ENTER OK="-1" Back="-1" Menu="-1" />
    </TRANSITION>
    <EVENT>
        <MOVE Left="-1" Right="-1" Up="-1" Down="-1" />
        <ENTER OK="512" Back="-1" Menu="-1" />
    </EVENT>
    <HELP>VARIOUS SETTING WILL BE MADE</HELP>
</BUTTON>
```
⎫D5

| | ARGUMENT 1 | ARGUMENT 2 | |
|---|---|---|---|
| DIRECT EVENT | CORRESPOND ONE TO ONE MAINLY TO REMOTE CONTROL KEYS | | |
| UP KEY | | | |
| DOWN KEY | | | |
| RIGHT KEY | | | |
| LEFT KEY | | | |
| BACK KEY | | | |
| CANCEL KEY | | | |
| ENTER KEY | | | |
| CHANNEL KEY | INTEGER | | |
| ADDITIONALLY, DIRECT TRANSFER OF REMOTE CONTROL KEYS | | | |

| | ARGUMENT 1 | ARGUMENT 2 | |
|---|---|---|---|
| HIGH LEVEL EVENT | RESULT OF CONTROL MAINLY ON GUI ITEMS | | |
| MENU EVENT | INTEGER | INTEGER | |
| INQUIRY ABOUT MENU | | INTEGER | |
| SELECTION CHANGE NOTIFICATION | | | |
| SELECTION CONFIRMATION NOTIFICATION | | | |
| SCROLL UP | | | |
| SCROLL DOWN | | | |
| SCROLL RIGHT | | | |
| SCROLL LEFT | | | |
| PREVIOUS PAGE | | | |
| NEXT PAGE | | | |
| TEXT TRANSFER | STRING | | |

FIG.10

| CONTROL REQUEST | ARGUMENT 1 | ARGUMENT 2 | |
|---|---|---|---|
| CONTROL OVER GUI<br>  GUI SHOW/HIDE<br>  ITEM SHOW/HIDE<br>  ITEM ENABLE/DISABLE<br>CONTROL OVER DISPLAY<br>  INPUT SELECT<br>  SWITCHING TO WIDE DISPLAY<br>  CAPTION ON/OFF<br>CONTROL OVER EQUIPMENT<br>  STEREO/SURROUND ON/OFF<br>  PICTURE QUALITY ADJUSTMENT<br>  VOLUME ADJUSTMENT<br>  SOUND QUALITY ADJUSTMENT<br>  (ADDITIONALLY, CONTROL<br>    OVER DISPLAY APPARATUS) | INTEGER | | |

RE

DM

```
<?xml version="1.0" encoding="UTF-8"?>
<ROOTITEM xmlns="http:// --------------- ">
    <ITEM Enabled="True"Visible="True">
        <CAPTION>PVR</CAPTION>
        <ID>0</ID>
        <HELP>MENU WILL BE SWITCHED FOR
PERSONAL VIDEO RECORDER</HELP>
        <COMMENT>Sony RDR-HX100</COMMENT>
    </ITEM>
</ROOTITEM>
```

```
<?xml version="1.0" encoding="UTF-8"?>
<REQUEST xmlns="http:// --------/Request.xsd">
    <ID>1037</ID>
    <NAME>Input Select</NAME>
    <ARGS>
        <DEVICEID>0</DEVICEID>
    </ARGS>
</REQUEST>
```

FIG. 21

```
<BUTTON Origin="0,240" Size="220,80" Enabled="True" Visible="True"
Selected="False" Latent="False">
    <CAPTION>FEATURES</CAPTION>
    <ID>515</ID>
    <TRANSITION>
        <MOVE Left="-1" Right="-1" Up="-1" Down="-1" />
        <ENTER OK="768" Back="-1" Menu="-1" />
    </TRANSITION>
    <EVENT>
        <MOVE Left="-1" Right="-1" Up="514" Down="516" />
        <ENTER OK="-1" Back="256" Menu="-1" />
    </EVENT>
</BUTTON>
```
⎬ D4

```
<BUTTON Origin="0,320" Size="220,80" Enabled="True" Visible="True"
Selected="False" Latent="False">
    <CAPTION>OPTIONS</CAPTION>
    <ID>516</ID>
    <TRANSITION>
        <MOVE Left="-1" Right="-1" Up="-1" Down="-1" />
        <ENTER OK="768" Back="-1" Menu="-1" />
    </TRANSITION>
    <EVENT>
        <MOVE Left="-1" Right="-1" Up="515" Down="517" />
        <ENTER OK="-1" Back="256" Menu="-1" />
    </EVENT>
</BUTTON>
```
⎬ D5

```
<BUTTON Origin="0,400" Size="220,80" Enabled="True" Visible="True"
Selected="False" Latent="False">
    <CAPTION>SIMPLE SETTING</CAPTION>
    <ID>517</ID>
    <TRANSITION>
        <MOVE Left="-1" Right="-1" Up="-1" Down="-1" />
        <ENTER OK="768" Back="-1" Menu="-1" />
    </TRANSITION>
    <EVENT>
        <MOVE Left="-1" Right="-1" Up="516" Down="-1" />
        <ENTER OK="-1" Back="256" Menu="-1" />
    </EVENT>
</BUTTON>
<GROUP>
```
⎬ D6

```
<GROUP>
    <BUTTON Origin="220,48" Size="420,48" Enabled="True" Visible="True"
    Selected="True">
        <CAPTION>TERRESTRIAL SETTING</CAPTION>
        <ID>768</ID>
        <TRANSITION>
```
⎬ D7

FIG.22

```
        <MOVE Left="-1" Right="-1" Up="-1" Down="769" />
        <ENTER OK="-1" Back="512" Menu="-1" />
    </TRANSITION>
    <EVENT>
        <MOVE Left="-1" Right="-1" Up="-1" Down="-1" />
        <ENTER OK="768" Back="-1" Menu="-1" />
    </EVENT>
</BUTTON>
```
⎬ D7

```
<BUTTON Origin="220,96" Size="420,48" Enabled="True" Visible="True"
  Selected="False">
    <CAPTION>BS SETTING</CAPTION>
    <ID>769</ID>
    <TRANSITION>
        <MOVE Left="-1" Right="-1" Up="768" Down="770" />
        <ENTER OK="-1" Back="512" Menu="-1" />
    </TRANSITION>
    <EVENT>
        <MOVE Left="-1" Right="-1" Up="-1" Down="-1" />
        <ENTER OK="769" Back="-1" Menu="-1" />
    </EVENT>
</BUTTON>
```
⎬ D8

```
<BUTTON Origin="220,144" Size="420,48" Enabled="True" Visible="True"
  Selected="False">
    <CAPTION>AREA NUMBER SETTING</CAPTION>
    <ID>770</ID>
    <TRANSITION>
        <MOVE Left="-1" Right="-1" Up="769" Down="771" />
        <ENTER OK="-1" Back="512" Menu="-1" />
    </TRANSITION>
    <EVENT>
        <MOVE Left="-1" Right="-1" Up="-1" Down="-1" />
        <ENTER OK="770" Back="-1" Menu="-1" />
    </EVENT>
</BUTTON>
```
⎬ D9

```
<BUTTON Origin="220,192" Size="420,48" Enabled="True" Visible="True"
  Selected="False">
    <CAPTION>GUIDE CHANNEL SETTING</CAPTION>
    <ID>771</ID>
    <TRANSITION>
        <MOVE Left="-1" Right="-1" Up="770" Down="772" />
        <ENTER OK="-1" Back="512" Menu="-1" />
    </TRANSITION>
    <EVENT>
        <MOVE Left="-1" Right="-1" Up="-1" Down="-1" />
        <ENTER OK="771" Back="-1" Menu="-1" />
    </EVENT>
</BUTTON>
```
⎬ D10

FIG.23

```
<BUTTON Origin="220,240" Size="420,48" Enabled="True" Visible="True"
Selected="False">
    <CAPTION>PROGRAM GUIDE SETTING</CAPTION>
    <ID>772</ID>
    <TRANSITION>
        <MOVE Left="-1" Right="-1" Up="771" Down="773" />
        <ENTER OK="-1" Back="512" Menu="-1" />
    </TRANSITION>
    <EVENT>
        <MOVE Left="-1" Right="-1" Up="-1" Down="-1" />
        <ENTER OK="772" Back="-1" Menu="-1" />
    </EVENT>
</BUTTON>
```
― D11

```
<BUTTON Origin="220,288" Size="420,48" Enabled="True" Visible="True"
Selected="False">
    <CAPTION>TIME SETTING</CAPTION>
    <ID>773</ID>
    <TRANSITION>
        <MOVE Left="-1" Right="-1" Up="772" Down="-1" />
        <ENTER OK="-1" Back="512" Menu="-1" />
    </TRANSITION>
    <EVENT>
        <MOVE Left="-1" Right="-1" Up="-1" Down="-1" />
        <ENTER OK="773" Back="-1" Menu="-1" />
    </EVENT>
</BUTTON>
</GROUP>
</DIALOG>
```
― D12

FIG.24

| BASIC SETTING | |
|---|---|
| | TERRESTRIAL SETTING |
| SCREEN SETTING | BS SETTING |
| AUDIO SETTING | AREA NUMBER SETTING |
| | GUIDE CHANNEL SETTING |
| FEATURES | PROGRAM GUIDE SETTING |
| | TIME SETTING |
| OPTIONS | |
| SIMPLE SETTING | PVR → SET |

```
<BUTTON Origin="0,240" Size="220,80" Enabled="True" Visible="True"
Selected="True" Latent="False">
    <CAPTION>FEATURES</CAPTION>
    <ID>515</ID>
    <TRANSITION>
        <MOVE Left="-1" Right="-1" Up="-1" Down="-1" />
        <ENTER OK="768" Back="-1" Menu="-1" />
    </TRANSITION>
    <EVENT>
        <MOVE Left="-1" Right="-1" Up="514" Down="516" />
        <ENTER OK="-1" Back="256" Menu="-1" />
    </EVENT>
</BUTTON>
```
⎬ D4

```
<BUTTON Origin="0,320" Size="220,80" Enabled="True" Visible="True"
Selected="False" Latent="False">
    <CAPTION>OPTIONS</CAPTION>
    <ID>516</ID>
    <TRANSITION>
        <MOVE Left="-1" Right="-1" Up="-1" Down="-1" />
        <ENTER OK="768" Back="-1" Menu="-1" />
    </TRANSITION>
    <EVENT>
        <MOVE Left="-1" Right="-1" Up="515" Down="517" />
        <ENTER OK="-1" Back="256" Menu="-1" />
    </EVENT>
</BUTTON>
```
⎬ D5

```
<BUTTON Origin="0,400" Size="220,80" Enabled="True" Visible="True"
Selected="False" Latent="False">
    <CAPTION>SIMPLE SETTING</CAPTION>
    <ID>517</ID>
    <TRANSITION>
        <MOVE Left="-1" Right="-1" Up="-1" Down="-1" />
        <ENTER OK="768" Back="-1" Menu="-1" />
    </TRANSITION>
    <EVENT>
        <MOVE Left="-1" Right="-1" Up="516" Down="-1" />
        <ENTER OK="-1" Back="256" Menu="-1" />
    </EVENT>
</BUTTON>
<GROUP>
```
⎬ D6

```
<GROUP>
    <BUTTON Origin="220,48" Size="420,48" Enabled="True" Visible="True"
    Selected="False">
        <CAPTION>AUTOMATIC CHAPTER MARK ¥t EVERY 6 MINUTES</CAPTION>
        <ID>768</ID>
        <TRANSITION>
```
⎬ D7

FIG.27

```xml
        <MOVE Left="-1" Right="-1" Up="-1" Down="769" />
        <ENTER OK="-1" Back="512" Menu="-1" />
    </TRANSITION>
    <EVENT>
        <MOVE Left="-1" Right="-1" Up="-1" Down="-1" />
        <ENTER OK="832" Back="-1" Menu="-1" />
    </EVENT>
</BUTTON>
```
⎬ D7

```xml
<BUTTON Origin="220,96" Size="420,48" Enabled="True" Visible="True"
Selected="False">
    <CAPTION>AUDIENCE AGE LIMIT</CAPTION>
    <ID>769</ID>
    <TRANSITION>
        <MOVE Left="-1" Right="-1" Up="768" Down="770" />
        <ENTER OK="-1" Back="512" Menu="-1" />
    </TRANSITION>
    <EVENT>
        <MOVE Left="-1" Right="-1" Up="-1" Down="-1" />
        <ENTER OK="833" Back="-1" Menu="-1" />
    </EVENT>
</BUTTON>
```
⎬ D8

```xml
<BUTTON Origin="220,144" Size="420,48" Enabled="True" Visible="True"
Selected="False">
    <CAPTION>LANGUAGE SETTING</CAPTION>
    <ID>770</ID>
    <TRANSITION>
        <MOVE Left="-1" Right="-1" Up="769" Down="771" />
        <ENTER OK="-1" Back="512" Menu="-1" />
    </TRANSITION>
    <EVENT>
        <MOVE Left="-1" Right="-1" Up="-1" Down="-1" />
        <ENTER OK="834" Back="-1" Menu="-1" />
    </EVENT>
</BUTTON>
```
⎬ D9

```xml
<BUTTON Origin="220,192" Size="420,48" Enabled="True" Visible="True"
Selected="False">
    <CAPTION>ADJUSTMENT FOR EXTRA INNINGS ¥t 60 MINUTES</CAPTION>
    <ID>771</ID>
    <TRANSITION>
        <MOVE Left="-1" Right="-1" Up="770" Down="772" />
        <ENTER OK="-1" Back="512" Menu="-1" />
    </TRANSITION>
    <EVENT>
        <MOVE Left="-1" Right="-1" Up="-1" Down="-1" />
        <ENTER OK="835" Back="-1" Menu="-1" />
    </EVENT>
</BUTTON>
```
⎬ D10

FIG.28

```
<BUTTON Origin="220,240" Size="420,48" Enabled="True" Visible="True"
Selected="False">
    <CAPTION>SYNCHRONIZED RECORDING ¥ RECORDING TO HDD</CAPTION>
    <ID>772</ID>
    <TRANSITION>
        <MOVE Left="-1" Right="-1" Up="771" Down="773" />
        <ENTER OK="-1" Back="512" Menu="-1" />
    </TRANSITION>
    <EVENT>
        <MOVE Left="-1" Right="-1" Up="-1" Down="-1" />
        <ENTER OK="836" Back="-1" Menu="-1" />
    </EVENT>
</BUTTON>
```
↗D11

```
<BUTTON Origin="220,288" Size="420,48" Enabled="True" Visible="True"
Selected="False">
    <CAPTION>HQ PICTURE QUALITY SETTING ¥ HQ</CAPTION>
    <ID>773</ID>
    <TRANSITION>
        <MOVE Left="-1" Right="-1" Up="772" Down="-1" />
        <ENTER OK="-1" Back="512" Menu="-1" />
    </TRANSITION>
    <EVENT>
        <MOVE Left="-1" Right="-1" Up="-1" Down="-1" />
        <ENTER OK="837" Back="-1" Menu="-1" />
    </EVENT>
</BUTTON>
</GROUP>
</DIALOG>
```
↗D12

FIG.29

| BASIC SETTING | |
|---|---|
| | AUTOMATIC CHAPTER MARK: EVERY 6 MINUTES |
| SCREEN SETTING | AUDIENCE AGE LIMIT |
| | LANGUAGE SETTING |
| AUDIO SETTING | ADJUSTMENT FOR EXTRA INNINGS: 60 MINUTES |
| FEATURES | SYNCHRONIZED RECORDING: RECORDING TO HDD |
| | HQ PICTURE QUALITY SETTING: HQ |
| OPTIONS | |
| SIMPLE SETTING | PVR → SET |

FIG.30

| BASIC SETTING | |
|---|---|
| | AUTOMATIC CHAPTER MARK: EVERY 6 MINUTES |
| SCREEN SETTING | AUDIENCE AGE LIMIT |
| | LANGUAGE SETTING |
| AUDIO SETTING | ADJUSTMENT FOR EXTRA INNINGS: 60 MINUTES |
| FEATURES | SYNCHRONIZED RECORDING: RECORDING TO HDD |
| | HQ PICTURE QUALITY SETTING: HQ |
| OPTIONS | |
| SIMPLE SETTING | PVR → SET |

FIG. 31

```xml
<?xml version="1.0" encoding="UTF-8"?>
<POPUP xmlns="http://-------------.org/Dialog.xsd" Parent="515" Origin="320,40"
 Size="300,180" Modal="True" Enabled="True" Visible="True">
    <ID>832</ID>
    <GROUP>
        <BUTTON Origin="0,0" Size="300,60" Enabled="True" Visible="True"
         Selected="False">
            <CAPTION>NO MARKING</CAPTION>
            <ID>840</ID>
            <TRANSITION>
                <MOVE Left="-1" Right="-1" Up="-1" Down="841" />
                <ENTER OK="-1" Back="-1" Menu="-1" />
            </TRANSITION>
            <EVENT>
                <MOVE Left="515" Right="-1" Up="-1" Down="-1" />
                <ENTER OK="840" Back="515" Menu="-1" />
            </EVENT>
        </BUTTON>
        <BUTTON Origin="0,60" Size="300,60" Enabled="True" Visible="True"
         Selected="True">
            <CAPTION>EVERY 6 MINUTES</CAPTION>
            <ID>841</ID>
            <TRANSITION>
                <MOVE Left="-1" Right="-1" Up="840" Down="842" />
                <ENTER OK="-1" Back="-1" Menu="-1" />
            </TRANSITION>
            <EVENT>
                <MOVE Left="515" Right="-1" Up="-1" Down="-1" />
                <ENTER OK="841" Back="515" Menu="-1" />
            </EVENT>
        </BUTTON>
        <BUTTON Origin="0,120" Size="300,60" Enabled="True" Visible="True"
         Selected="False">
            <CAPTION>EVERY 15 MINUTES</CAPTION>
            <ID>842</ID>
            <TRANSITION>
                <MOVE Left="-1" Right="-1" Up="841" Down="-1" />
                <ENTER OK="-1" Back="-1" Menu="-1" />
            </TRANSITION>
            <EVENT>
                <MOVE Left="515" Right="-1" Up="-1" Down="-1" />
                <ENTER OK="842" Back="515" Menu="-1" />
            </EVENT>
        </BUTTON>
    </GROUP>
</POPUP>
```

FIG. 34

```
<?xml version="1.0" encoding="UTF-8"?>
<DIALOG xmlns="http://-------------.org/Dialog.xsd" Size="640,480" Enabled="True"
Visible="True">
    <ID>515</ID>
```
— DM1

```
    <GROUP>
        <BUTTON Origin="0,0" Size="220,80" Enabled="True" Visible="True"
        Selected="False" Latent="False">
            <CAPTION>BASIC SETTING</CAPTION>
            <ID>512</ID>
            <TRANSITION>
                <MOVE Left="-1" Right="-1" Up="-1" Down="-1" />
                <ENTER OK="768" Back="-1" Menu="-1" />
            </TRANSITION>
            <EVENT>
                <MOVE Left="-1" Right="-1" Up="-1" Down="513" />
                <ENTER OK="-1" Back="256" Menu="-1" />
            </EVENT>
        </BUTTON>
```
— D1

```
        <BUTTON Origin="0,80" Size="220,80" Enabled="True" Visible="True"
        Selected="False" Latent="False">
            <CAPTION>SCREEN SETTING</CAPTION>
            <ID>513</ID>
            <TRANSITION>
                <MOVE Left="-1" Right="-1" Up="-1" Down="-1" />
                <ENTER OK="768" Back="-1" Menu="-1" />
            </TRANSITION>
            <EVENT>
                <MOVE Left="-1" Right="-1" Up="512" Down="514" />
                <ENTER OK="-1" Back="256" Menu="-1" />
            </EVENT>
        </BUTTON>
```
— D2

```
        <BUTTON Origin="0,160" Size="220,80" Enabled="True" Visible="True"
        Selected="False" Latent="False">
            <CAPTION>AUDIO SETTING</CAPTION>
            <ID>514</ID>
            <TRANSITION>
                <MOVE Left="-1" Right="-1" Up="-1" Down="-1" />
                <ENTER OK="768" Back="-1" Menu="-1" />
            </TRANSITION>
            <EVENT>
                <MOVE Left="-1" Right="-1" Up="513" Down="515" />
                <ENTER OK="-1" Back="256" Menu="-1" />
            </EVENT>
        </BUTTON>
```
— D3

FIG.35

```
<BUTTON Origin="0,240" Size="220,80" Enabled="True" Visible="True"
Selected="False" Latent="True">
    <CAPTION>FEATURES</CAPTION>
    <ID>515</ID>
    <TRANSITION>
        <MOVE Left="-1" Right="-1" Up="-1" Down="-1" />
        <ENTER OK="768" Back="-1" Menu="-1" />
    </TRANSITION>
    <EVENT>
        <MOVE Left="-1" Right="-1" Up="514" Down="516" />
        <ENTER OK="-1" Back="256" Menu="-1" />
    </EVENT>
</BUTTON>
```
⎬ D4

```
<BUTTON Origin="0,320" Size="220,80" Enabled="True" Visible="True"
Selected="False" Latent="False">
    <CAPTION>OPTIONS</CAPTION>
    <ID>516</ID>
    <TRANSITION>
        <MOVE Left="-1" Right="-1" Up="-1" Down="-1" />
        <ENTER OK="768" Back="-1" Menu="-1" />
    </TRANSITION>
    <EVENT>
        <MOVE Left="-1" Right="-1" Up="515" Down="517" />
        <ENTER OK="-1" Back="256" Menu="-1" />
    </EVENT>
</BUTTON>
```
⎬ D5

```
<BUTTON Origin="0,400" Size="220,80" Enabled="True" Visible="True"
Selected="False" Latent="False">
    <CAPTION>SIMPLE SETTING</CAPTION>
    <ID>517</ID>
    <TRANSITION>
        <MOVE Left="-1" Right="-1" Up="-1" Down="-1" />
        <ENTER OK="768" Back="-1" Menu="-1" />
    </TRANSITION>
    <EVENT>
        <MOVE Left="-1" Right="-1" Up="516" Down="-1" />
        <ENTER OK="-1" Back="256" Menu="-1" />
    </EVENT>
</BUTTON>
<GROUP>
```
⎬ D6

```
<GROUP>
    <BUTTON Origin="220,48" Size="420,48" Enabled="True" Visible="True"
    Selected="True">
```
⎬ D7

FIG.36

```
        <CAPTION>AUTOMATIC CHAPTER MARK ¥t EVERY 15 MINUTES</CAPTION>
        <ID>768</ID>
        <TRANSITION>
            <MOVE Left="-1" Right="-1" Up="-1" Down="769" />
            <ENTER OK="-1" Back="515" Menu="-1" />
        </TRANSITION>
        <EVENT>
            <MOVE Left="-1" Right="-1" Up="-1" Down="-1" />
            <ENTER OK="832" Back="-1" Menu="-1" />
        </EVENT>
    </BUTTON>
                                                                    ⎬ D7

<BUTTON Origin="220,96" Size="420,48" Enabled="True" Visible="True"
    Selected="False">
        <CAPTION>AUDIENCE AGE LIMIT</CAPTION>
        <ID>769</ID>
        <TRANSITION>
            <MOVE Left="-1" Right="-1" Up="768" Down="770" />
            <ENTER OK="-1" Back="515" Menu="-1" />
        </TRANSITION>
        <EVENT>
            <MOVE Left="-1" Right="-1" Up="-1" Down="-1" />
            <ENTER OK="833" Back="-1" Menu="-1" />
        </EVENT>
    </BUTTON>
                                                                    ⎬ D8

<BUTTON Origin="220,144" Size="420,48" Enabled="True" Visible="True"
    Selected="False">
        <CAPTION>LANGUAGE SETTING</CAPTION>
        <ID>770</ID>
        <TRANSITION>
            <MOVE Left="-1" Right="-1" Up="769" Down="771" />
            <ENTER OK="-1" Back="515" Menu="-1" />
        </TRANSITION>
        <EVENT>
            <MOVE Left="-1" Right="-1" Up="-1" Down="-1" />
            <ENTER OK="834" Back="-1" Menu="-1" />
        </EVENT>
    </BUTTON>
                                                                    ⎬ D9

<BUTTON Origin="220,192" Size="420,48" Enabled="True" Visible="True"
    Selected="False">
        <CAPTION>ADJUSTMENT FOR EXTRA INNINGS ¥t 60 MINUTES</CAPTION>
        <ID>771</ID>
        <TRANSITION>
                                                                    ⎬ D10
```

FIG.37

```
            <MOVE Left="-1" Right="-1" Up="770" Down="772" />
            <ENTER OK="-1" Back="515" Menu="-1" />
        </TRANSITION>
        <EVENT>
            <MOVE Left="-1" Right="-1" Up="-1" Down="-1" />
            <ENTER OK="835" Back="-1" Menu="-1" />
        </EVENT>
    </BUTTON>
    <BUTTON Origin="220,240" Size="420,48" Enabled="True" Visible="True"
    Selected="False">
        <CAPTION>SYNCHRONIZED RECORDING ¥t RECORDING TO HDD</CAPTION>
        <ID>772</ID>
        <TRANSITION>
            <MOVE Left="-1" Right="-1" Up="771" Down="773" />
            <ENTER OK="-1" Back="515" Menu="-1" />
        </TRANSITION>
        <EVENT>
            <MOVE Left="-1" Right="-1" Up="-1" Down="-1" />
            <ENTER OK="836" Back="-1" Menu="-1" />
        </EVENT>
    </BUTTON>
    <BUTTON Origin="220,288" Size="420,48" Enabled="True" Visible="True"
    Selected="False">
        <CAPTION>HQ PICTURE QUALITY SETTING ¥t HQ</CAPTION>
        <ID>773</ID>
        <TRANSITION>
            <MOVE Left="-1" Right="-1" Up="772" Down="-1" />
            <ENTER OK="-1" Back="515" Menu="-1" />
        </TRANSITION>
        <EVENT>
            <MOVE Left="-1" Right="-1" Up="-1" Down="-1" />
            <ENTER OK="837" Back="-1" Menu="-1" />
        </EVENT>
    </BUTTON>
  </GROUP>
</DIALOG>
```

- D10 (top block ending with first `</BUTTON>`)
- D11 (middle BUTTON block)
- D12 (bottom BUTTON block through `</DIALOG>`)

FIG.38

| BASIC SETTING | |
| --- | --- |
| | AUTOMATIC CHAPTER MARK: EVERY 15 MINUTES |
| SCREEN SETTING | AUDIENCE AGE LIMIT |
| AUDIO SETTING | LANGUAGE SETTING |
| | ADJUSTMENT FOR EXTRA INNINGS: 60 MINUTES |
| FEATURES | SYNCHRONIZED RECORDING: RECORDING TO HDD |
| | HQ PICTURE QUALITY SETTING: HQ |
| OPTIONS | |
| SIMPLE SETTING | PVR → SET |

FIG.39

| BASIC SETTING | |
| --- | --- |
| | AUTOMATIC CHAPTER MARK: EVERY 15 MINUTES |
| SCREEN SETTING | AUDIENCE AGE LIMIT |
| AUDIO SETTING | LANGUAGE SETTING |
| | ADJUSTMENT FOR EXTRA INNINGS: 60 MINUTES |
| FEATURES | SYNCHRONIZED RECORDING: RECORDING TO HDD |
| | HQ PICTURE QUALITY SETTING: HQ |
| OPTIONS | |
| SIMPLE SETTING | PVR → SET |

ELECTRONIC EQUIPMENT, SYSTEM FOR VIDEO CONTENT, AND DISPLAY METHOD

CROSS REFERENCES TO RELATED APPLICATIONS

The present document contains subject matter related to Japanese Patent Application JP 2005-215395 filed in the Japanese Patent Office on Jul. 26, 2005, the entire contents of which being incorporated herein by reference.

BACKGROUND OF THE INVENTION

1. Field of the Invention

The present invention relates to electronic equipment, a system for video content, and a display method, and is applicable to cases where a system is constructed by connecting a monitor to various kinds of video equipment via, e.g., a home network. In the present invention, external equipment being the various kinds of video equipment transmits metadata for defining at least a menu type and focus transition, to a system display being the monitor, and the system display displays a menu screen thereon, and further notifies the external equipment of what has been selected from the menu items displayed. Accordingly, it is made possible to enhance the user-friendliness of a graphical user interface for the external equipment compared with that for related art equipment.

2. Background of the Invention

In the past, television receivers, when having selected an external input through operation of their remote commander, provide a user with video content based on a video signal and an audio signal inputted from the terminals of the selected external input, in place of a video signal and an audio signal outputted by a built-in tuner. Thus, the television receivers can be used as monitors for video content supplied from external equipment. And in order to facilitate such selection and the like in the external equipment, television receivers have been available in which a menu screen is displayed via a graphical user interface to accept operations by a user.

Furthermore, some external equipment switch their function through operation with a remote commander dedicated thereto, and in order to simplify the operation of the remote commander, they display various menus via a graphical user interface for accepting the user's operation.

As one example of such a graphical user interface, e.g., Japanese Patent Application Publication No. H05-333838 has proposed a method in which a cursor is displayed and the display of the cursor is suspended after a predetermined time has elapsed, whereby to enhance, e.g., the user-friendliness.

SUMMARY OF THE INVENTION

By the way, in a case of viewing, on a television receiver, video content played by a DVD recorder, the user first selects an external input which corresponds to the DVD recorder, using a remote commander of the television receiver, and then operates to control the DVD recorder using a remote commander of the DVD recorder. Thus, the user must operate both the remote commander of the television receiver and that of the DVD recorder, thus facing a problem that the user-friendliness is unsatisfactory. Note here that the DVD recorder is a recording/playback apparatus for recording and playing video content using optical discs being DVDS.

Furthermore, in this case, due to switching from a graphical user interface of the television receiver to a graphical user interface of the external equipment, consistency cannot be achieved in these graphical user interfaces each involving a series of operation, in terms of how they work and look. The problem that the user-friendliness is unsatisfactory is similarly imposed, to the extent that erroneous operation may occur in some serious cases.

In some television receivers, a video signal from external equipment is processed to be displayed in a slave screen. In this situation, a menu screen of the external equipment may in some cases be displayed in the slave screen located on a menu screen of the television receiver, by operating the remote commanders of both the television receiver and the external equipment. In such cases, the display becomes extremely complicated, and thus the user may have trouble about performing proper operation.

The present invention has been made in view of the above circumstances, and proposes electronic equipment, a system for video content, and a display method, all enabling enhancement of the user-friendliness of a graphical user interface for external equipment, compared with that for the related art equipment.

A first aspect of the present invention provides electronic equipment which includes: a storage section, a metadata acquisition section, a remote commander, a menu screen generation processing section, and a notification processing section. The storage section stores data for creating a menu screen. The metadata acquisition section acquires metadata for displaying a menu item for operating external equipment, from the external equipment. Herein, the metadata has data for defining at least a type of the menu item and transition of a menu focus. The remote commander operation detection section detects operation performed on a remote commander. The menu screen generation processing section adds the menu item based on the metadata to the menu screen, for assembly. The notification processing section notifies the external equipment of the menu item selected on the menu screen, on the basis of a detection result of the remote commander operation detection section. In the electronic equipment, the menu screen generation processing section makes the menu focus transit on the basis of the metadata and the detection result of the remote commander operation detection section.

A second aspect of the present invention provides a system for video content in which video equipment that outputs video data of the video content is connected to electronic equipment having a display section. The electronic equipment includes a metadata acquisition section, a remote commander operation detection section, a menu screen generation section, and a notification section. The metadata acquisition section acquires metadata for defining at least a type of a menu item and transition of a menu focus in a menu screen for display on the display section, from the video equipment. The remote commander operation detection section detects operation performed on a remote commander. The menu screen generation section generates video data used to display the menu screen by changing display of the menu item on the basis of the metadata and a detection result of the remote commander operation detection section. The notification section notifies the video equipment of selection of a menu in the menu screen, on the basis of the detection result of the remote commander operation detection section. The video equipment includes a video data output section, a metadata output section, a notification acquisition section, and a control section. The video data output section outputs the video data of the video content, to the electronic equipment. The metadata output section outputs the metadata to the electronic equipment according to an instruction from the electronic equipment. The notification acquisition section acquires notification about the selection of the menu. The control section instructs output of the metadata corresponding to a menu item whose hierarchical level follows that of the menu item corresponding to the metadata, according to the notification about the selection of the menu acquired by the notification acquisition section.

A third aspect of the present invention provides a method for displaying an operation menu for external equipment, which includes the steps of: acquiring metadata for defining at least a menu type and transition of a focus in a menu screen, from the external equipment; detecting operation performed on a remote commander; generating video data used to display the menu screen by making the menu focus transit on the basis of the metadata and a detection result as to the operation performed on the remote commander; and notifying the external equipment of selection of a menu in the menu screen on the basis of the detection result as to the operation performed on the remote commander.

According to the first aspect of the present invention, the external equipment can switch its function in response to menu selection operation performed on the remote commander of the electronic equipment, whereby the user can switch the operation of the external equipment without selectively operating the remote commander of the electronic equipment and the remote commander of the external equipment. Consequently, the user-friendliness can be enhanced. Furthermore, the menu screen for the external equipment is created by the electronic equipment on the basis of metadata so that consistency in operation and look in the graphical user interface can be achieved. As a result, the user-friendliness can also be enhanced.

According to the second and third aspects of the present invention, a system for video content and a display method can be provided, by which the user-friendliness of the graphical user interface for the external equipment can be enhanced compared with that for the conventional equipment.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 7 is a representation continued from FIG. 6;

FIG. 8 is a representation for explaining a type of event;

FIG. 9 is a representation for explaining another type of event;

FIG. 10 is a representation for explaining control requests;

FIG. 21 is a representation continued from FIG. 20;

FIG. 22 is a representation continued from FIG. 21;

FIG. 23 is a representation continued from FIG. 22;

FIG. 24 is a plan view showing a menu screen based on the metadata of FIGS. 20-23;

FIG. 26 is a representation continued from FIG. 25;

FIG. 27 is a representation continued from FIG. 26;

FIG. 28 is a representation continued from FIG. 27;

FIG. 29 is a plan view showing a menu screen based on the metadata of FIGS. 25-28;

FIG. 30 is a plan view showing focus transition in the menu screen of FIG. 29;

FIG. 31 is a representation of metadata on a pop-up menu;

FIG. 34 is a representation of metadata according to the settings of the menu screen of FIG. 33;

FIG. 35 is a representation continued from FIG. 34;

FIG. 36 is a representation continued from FIG. 35;

FIG. 37 is a representation continued from FIG. 36;

FIG. 38 is a plan view showing a menu screen based on the metadata of FIGS. 32-37;

FIG. 39 is a plan view showing focus transition in the menu screen of FIG. 38;

DESCRIPTION OF THE INVENTION

Figure 1:
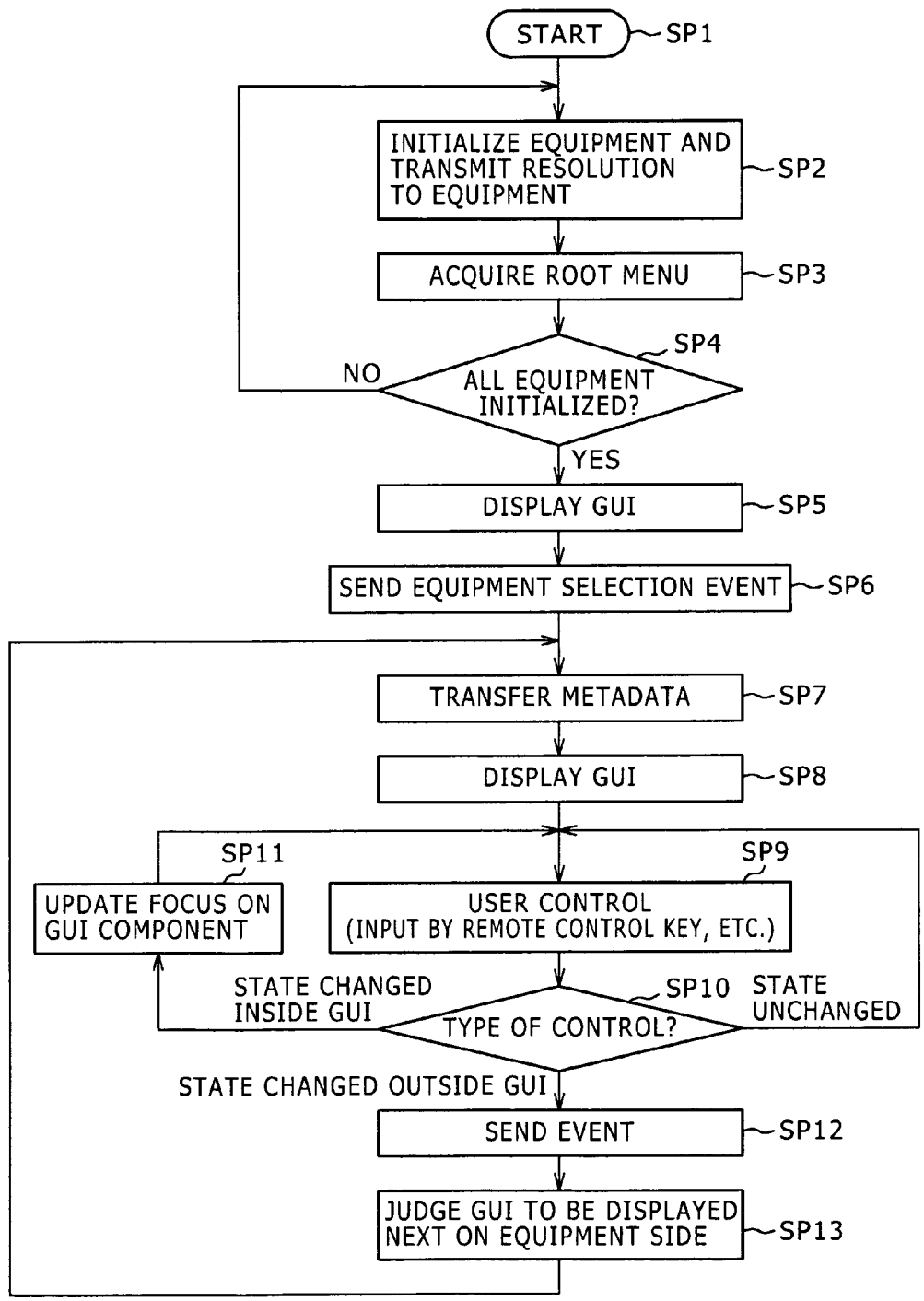
FIG. 1 is a flowchart for explaining operation of an AV system according to an embodiment of the present invention.

Embodiments of the present invention will now be described in detail by referring to the drawings as appropriate.

Embodiment 1

(1) Configuration of Embodiment

Figure 2:
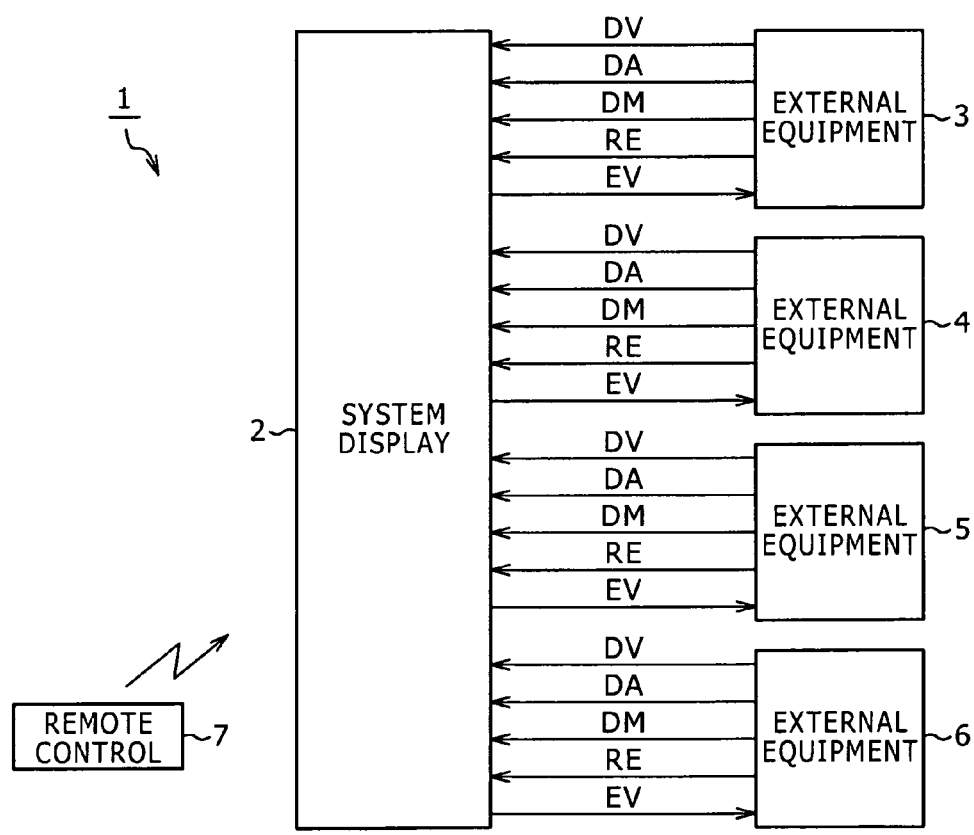
FIG. 2 is a block diagram showing the AV system according to the embodiment of the present invention.

FIG. 2 is a block diagram showing an AV system according to an embodiment of the present invention. The AV system 1 is a home network system for video content, which includes a system display 2 being a monitor. External equipment 3-6 relating to various video content provided via the system display 2 are connected to the system display 2.

Here, the external equipment 3-6 are, e.g., a tuner for terrestrial digital broadcasting, a DVD recorder, a HDD recorder that records/plays back video content by a hard disk apparatus, a network server that acquires and holds therein various video content by connection to a network, and the like. They are connected to the system display 2 via, e.g., a home network, and output video data DV and audio data DA of the video content to the system display 2 by operating a remote commander (remote control) 7 of the system display 2. Note that the connection of the system display 2 and external equipment 3-6 may be implemented not only via the home network, but also via various interfaces. Furthermore, the video data DV and audio data DA may also be transmitted as an analog signal.

Figure 3:
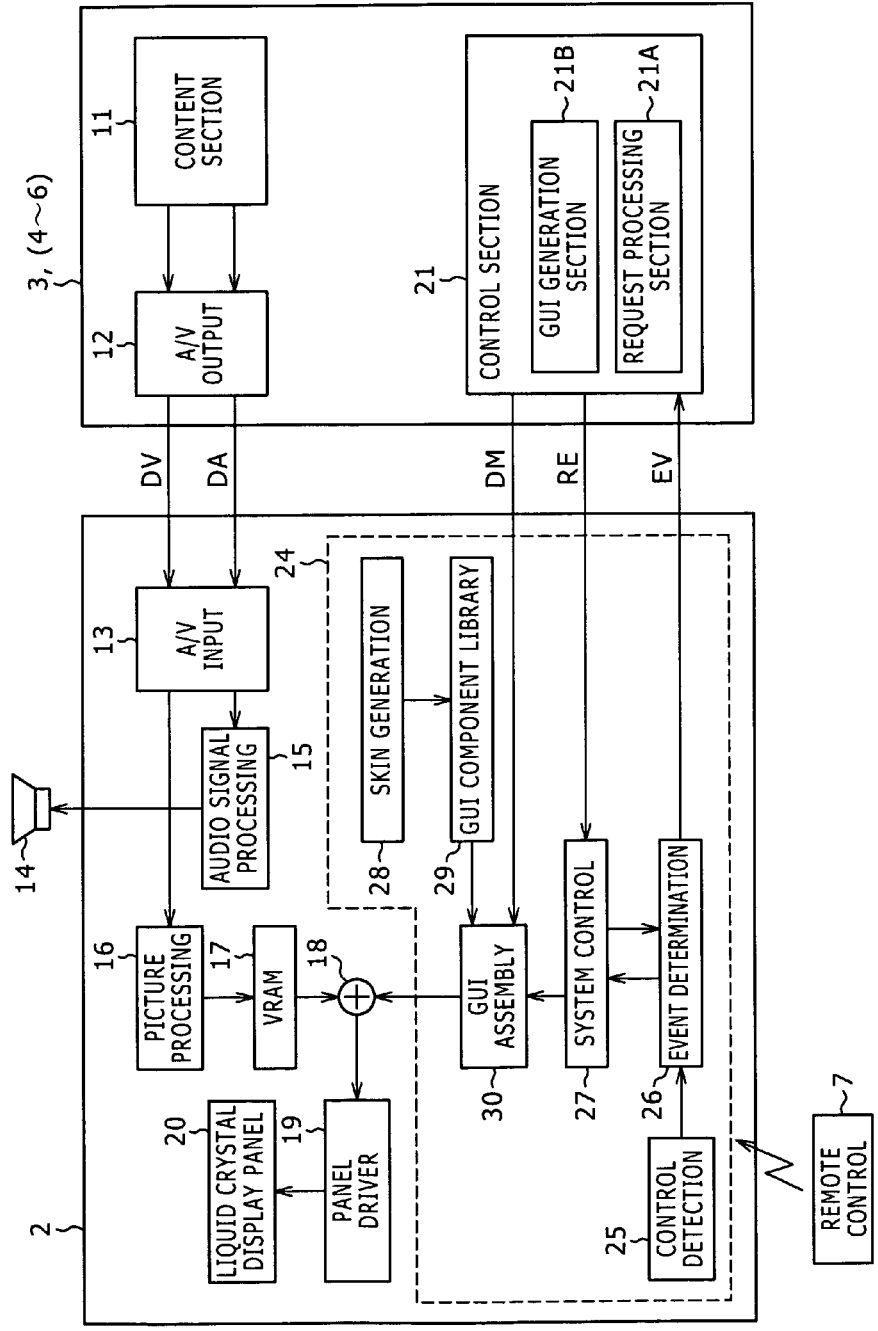
FIG. 3 is a block diagram showing in detail a system display and external equipment in the AV system of FIG. 2.

Thus, as shown in FIG. 3, each of the external equipment 3-6 is provided with a content section 11 for outputting the video data DV and audio data DA of the video content, and an audio/video output section (A/V output) 12 for outputting, to the home network, the video data DV and audio data DA from the content section 11.

Furthermore, to be compatible in configuration with these equipment 3-6, the system display 2 includes an audio/video input section (A/V input) 13 for inputting the video data DV and audio data DA transmitted thereto from the home network. It also includes an audio signal processing section 15 for processing the audio data DA inputted from the audio/video input section 13 to drive speakers 14. Furthermore, the system display 2 includes a liquid crystal display panel 20 being a display section for displaying videos based on the video data DV. It further includes an image processing section 16 for processing the video data DV inputted from the audio/video input section 13 to output image data, a video random-access memory (VRAM) 17 for mapping out and holding therein the image data outputted from the image processing section 16, an addition circuit 18 for outputting the image data mapped out in the VRAM 17, and a panel driver 19 for driving the liquid crystal display panel 20 with the image data outputted from the addition circuit 18.

Furthermore, each of the external equipment 3-6 each exchanges, with the system display 2, various data related to display of menu screens, various operation using the remote commander 7, and the like in the system display 2. Here, the various data includes metadata DM, control requests RE, events EV. Here, the metadata DM means data for defining a menu type, focus transition settings and the like for display on a menu screen in the system display 2, so as to be associated with events EV. The control request RE means data for instructing the system display 2 to switch operation, and an event EV means data for notifying any of the external equipment 3-6 of operation performed on the remote commander, via an event ID defined in metadata DM. Note that the metadata may additionally include bit map data and the like for forming a menu image.

To be compatible with the exchange of such various data related to various operations, each of the external equipment 3-6 is provided with a control section 21, which executes a series of processing on the metadata DM, control requests RE, and events EV. That is, the control section 21 of these external equipment 3-6 is formed of arithmetic processing means for controlling the whole operation by execution of a program recorded in a built-in memory. When the external equipment is connected to a monitor, a television receiver or the like having an existing configuration, other than the system display 2, the control section 21 controls the operation of the various parts in response to operation through a dedicated remote commander or the like. Thus, these external equipment 3-6 display hierarchically structured menu screens on the monitor or the television receiver having an existing configuration, and outputs the video data DV and audio data DA of various video content, to the monitor or the television receiver having the existing configuration, responsive to selection operation effected by a user on any of these screens.

Thus, the control section 21 constitutes a graphical user interface for displaying the menu screens on which the function of the equipment is switched through operation on the remote commander, and hence includes a function block as a GUI generation section 21B for generating video data DV on menu screens being the graphical user interface. Furthermore, the control section 21 includes a function block as a request processing section 21A for processing user requests executed by the dedicated remote commander, and further, a function block for detecting operation on the dedicated remote commander, and the like.

As thus expanded with these function blocks, the control section 21, when having the system display 2 connected thereto, sends metadata DM to the system display 2 using its function block as the GUI generation section 21B, and processes events EV from the system display 2 and further sends control requests RE to the system display 2 using its request processing section 21A.

Furthermore, to be compatible with the exchange of various data related to such various operations, the system display 2 likewise includes a control section 24 formed of arithmetic processing means for controlling the whole operation with a program recorded in a built-in memory, and peripheral circuitry. The control section 24 includes various function blocks for a graphical user interface. Note that in this embodiment, the programs relating to execution by the control sections 24, 21 of the system display 2 and the external equipment 3-6 are provided by installation in the system display 2 and the external equipment 3-6, respectively. However, the programs may otherwise be provided by downloading via a network such as the Internet, or via various recording media such as optical discs, magnetic discs, memory cards, and the like.

Of the function blocks of the control section 24 in the system display 2 here, the operation detection section 25 is a function block for detecting operation on the remote commander 7, together with a circuit block for receiving a remote control signal from the remote commander 7. An event determination section 26 is a function block for judging whether or not the operation on the remote commander 7 is related to any one of the system display 2, external equipment 3-6, and outputting an event EV to the corresponding equipment. Furthermore, a system control section 27 is a function block for controlling the respective function blocks of the control section 24. A skin generation section 28 is a function block for generating a skin used to display a menu screen. Furthermore, a GUI component library 29 is a function block for holding and outputting the image data of various components, such as menus, buttons, list boxes, used to generate the menu screen. A GUI assembly section 30 is a function block for creating the menu screen using components from the GUI component library 29 and skins from the skin generation section 28. The thus formed control section 24 outputs video data generated by the GUI assembly section 30 to the panel driver 19 through the addition circuit 18, whereby the menu screen is displayed as superimposed on an image formed of the image data outputted from the VRAM 17. Thus, in this embodiment, in the control section 24, a menu screen generation section is formed of the skin generation section 28, the GUI component library 29, and the GUI assembly section 30.

Figure 4:
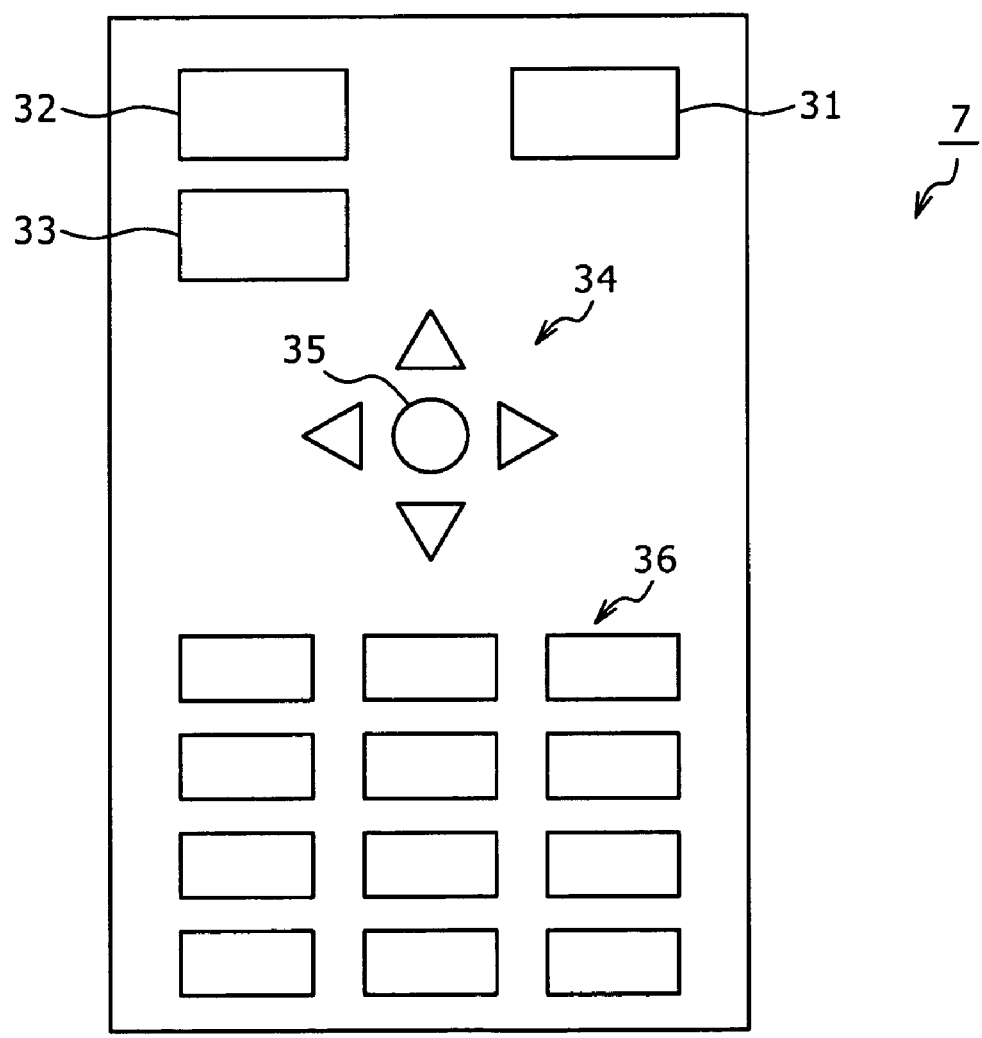
FIG. 4 is a plan view showing a remote commander of the system display in the AV system of FIG. 2.

Here, FIG. 4 is a plan view showing the remote commander 7 of the system display 2. The remote commander 7 includes a Power key 31 for turning on and off the system display 2, a Menu key 32 for instructing a main menu screen to be displayed, a Back key 33, a Cursor operation key 34 for moving a cursor in Up/Down/Left/Right directions, an OK key 35, a Channel select key 36, and the like. The remote commander 7 transmits a remote control signal based on a control code corresponding to operation effected by each of these keys 31-36, via infrared or other wireless communication means.

Figure 5:
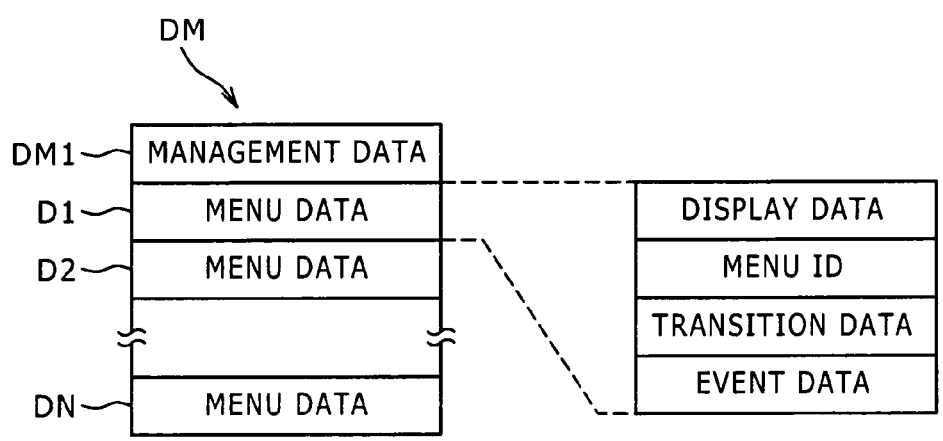
FIG. 5 is a representation of metadata.
Figure 6:
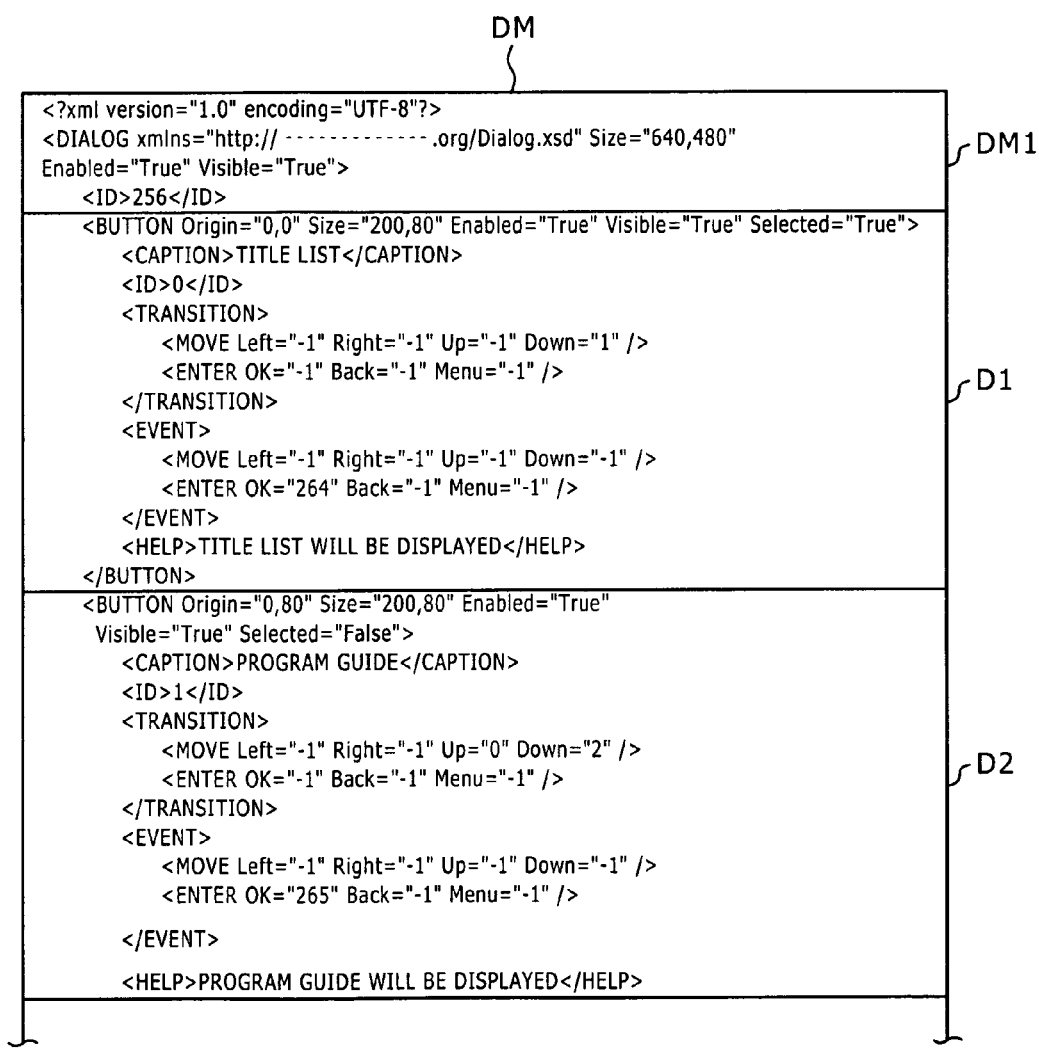
FIG. 6 is a representation of metadata on a top menu.

FIG. 5 is a representation for explaining metadata DM. The metadata DM includes management data DM1 of the metadata DM, and menu data D1-DN on respective menus to be displayed on the basis of the metadata DM. Here, the management data DM1 includes, as shown by examples in FIGS. 6 and 7, a recording of the version of the metadata DM (version), the encoding tool for the metadata DM (encoding) and the like, followed by a recording of the size of the entire menu screen (Size), a screen usable/unusable setting (Enabled), a visible/invisible setting (Visible), and another recording of a metadata ID (<ID>256<ID>) of the metadata. Here, the metadata ID is an identifier used by external equipment outputting the metadata DM to identify the metadata DM, whereby a unique value is set to each of metadata as far as various metadata DM outputted from single external equipment is concerned. Thus, the metadata DM according to the examples shown in FIGS. 6 and 7 is sent to the system display 2 from the external equipment as set to be visible on the basis of the metadata ID being a value 256. Note that FIGS. 6 and 7 show metadata DM on a top menu screen provided from the external equipment being a HDD recorder.

Figure 20:
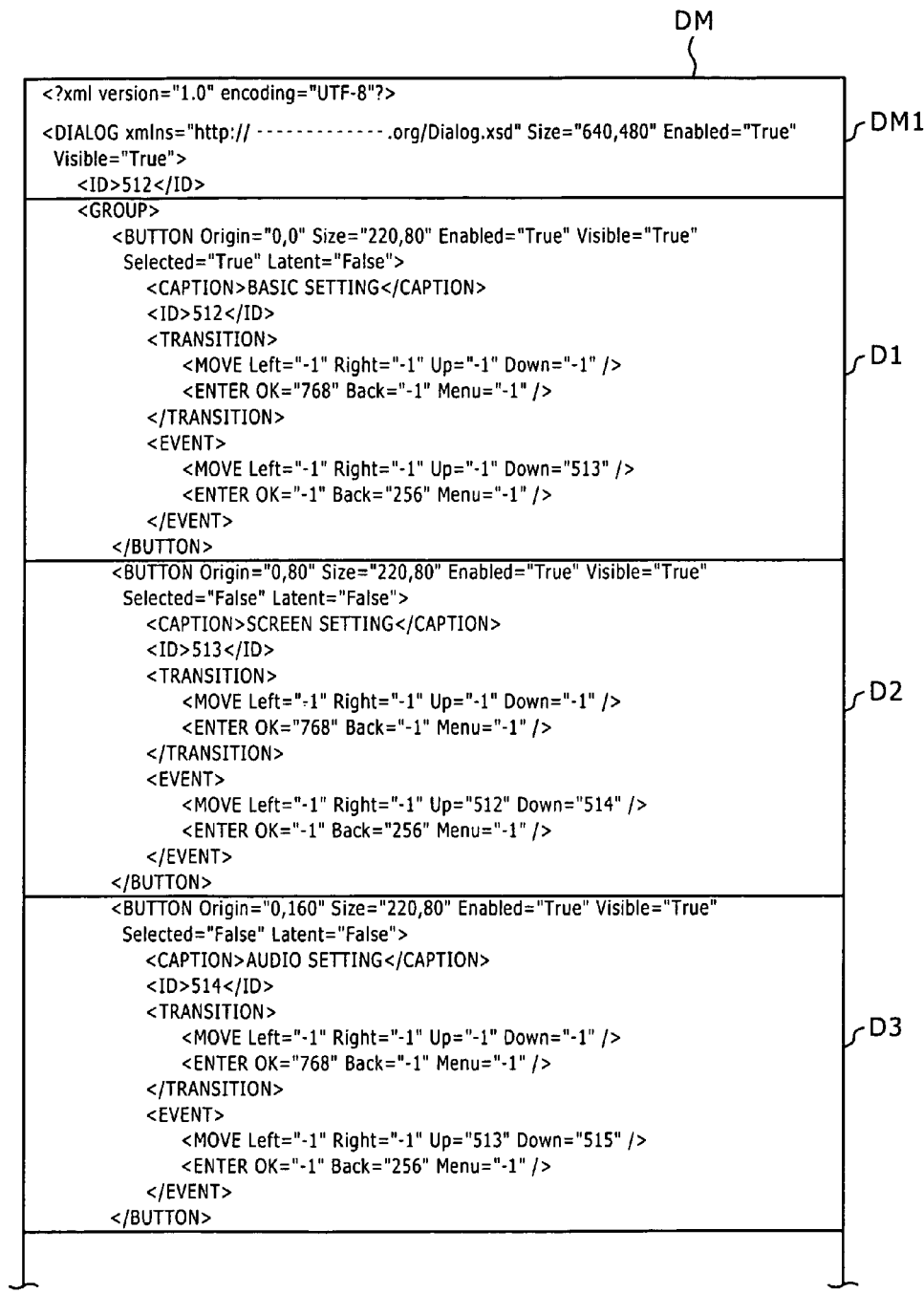
FIG. 20 is a representation of metadata on lower-level menus belonging to the top menu.
Figure 25:
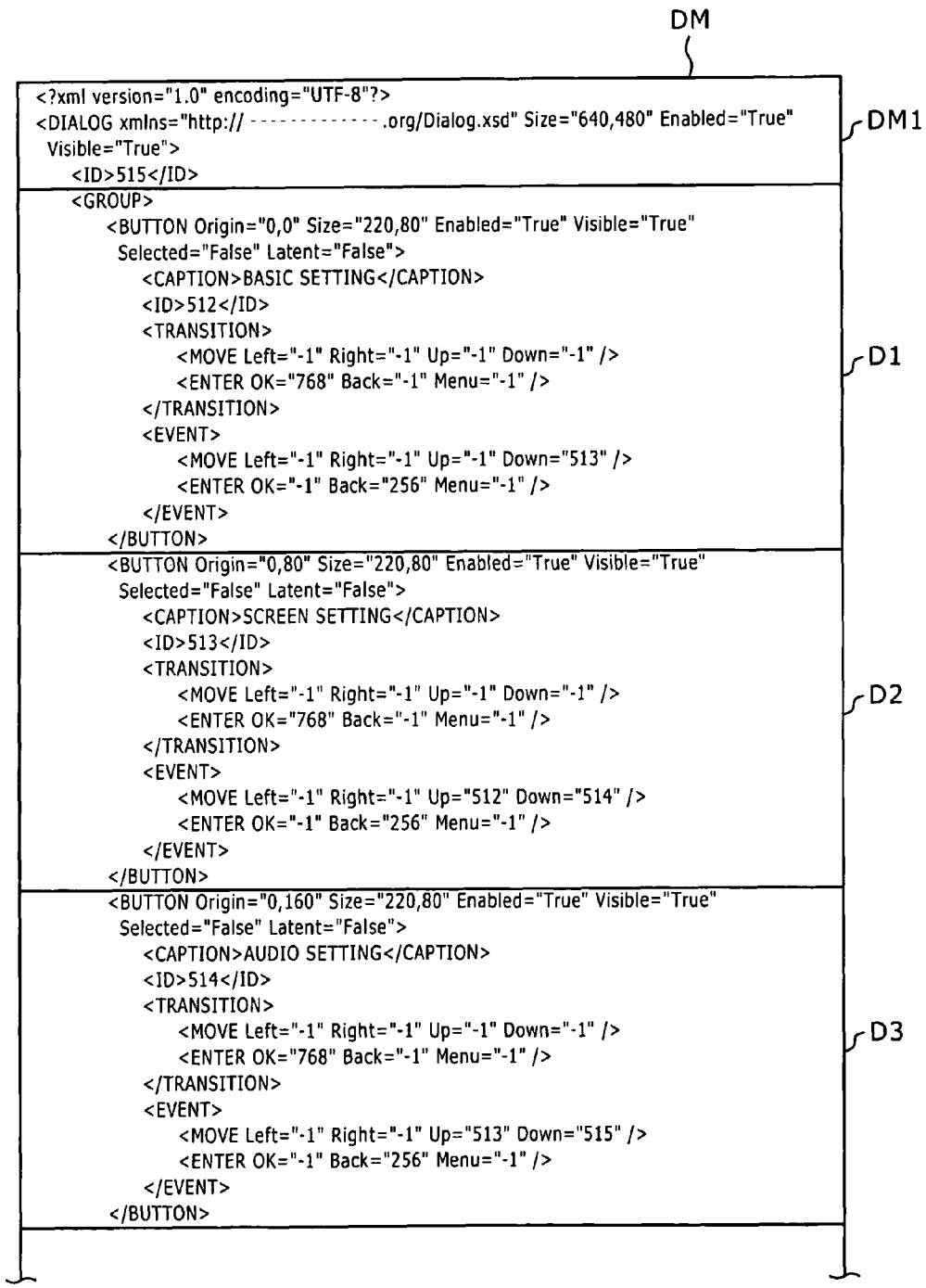
FIG. 25 is a representation of metadata on focus transition in the menus based on the metadata of FIGS. 20-23.

Meanwhile, the menu data D1-DN each include display data, a menu ID, transition data, and event data. More specifically, the display data defines a menu to be displayed by the menu data. There are assigned a menu type (BUTTON), a display position (Origin), the size (Size), the usable/unusable setting (Enabled), the visible/invisible setting (Visible), focus settings (Selected), and a title to be displayed on the menu (<CAPTION>Title List<CAPTION>). Note that as later described with reference to FIG. 20, a flag for instructing a selection situation to be saved (Latent) may be set in some cases. Thus, in the first menu data D1 according to the examples shown in FIGS. 6 and 7, it is recorded that a pushbutton type menu named "TITLE LIST" will be displayed at a predetermined position in a predetermined size, whereas in the next menu data D2, it is recorded that a pushbutton type menu named "PROGRAM GUIDE" will be similarly displayed.

The menu ID is an identifier used to identify menu data from other menu data, whereby a value unique to each menu data is assigned as far as various menu data assigned to single metadata DM is concerned. Thus, in the examples shown in FIGS. 6 and 7, the first menu data D1 has its menu ID set to 0, and the next menu data D2 has its menu ID set to 1.

The transition data defines a transition destination of a menu focus according to operation effected on the remote commander 7. In this embodiment, the transition destination is defined by the menu ID of each of the menu data D1-DN, and when the transition data is set to −1, focus transition is prohibited. Thus, in the examples shown in FIGS. 6 and 7, if any of leftward (MOVE Left), rightward (Right), and upward (Up) keys 34 is pressed in the remote commander 7 with the focus being set to the menu data D1 at the beginning, it is defined that the focus should be moved nowhere, whereas if a downward (Down) key 34 is pressed, it is defined that the focus is switched to a menu item based on the next menu data D2 whose menu ID is set to 1. Furthermore, since there is a description that ENTER OK="−1"Back="−1"Menu="−1", it is defined that the focus is not moved if any of the OK key 35, Back key 33, and Menu key 32 is pressed. Meanwhile, in the next menu data D2, since there is a description that Up="0" Down="2", it is defined that the focus is switched to the menu data D1 and the menu data D3 if the Up and Down keys 34 are pressed, respectively. Note that the focus switching may be executed not only by these transition data settings, but also by event data settings within metadata DM as later described with reference to FIGS. 20-23.

Meanwhile, the event data defines, using an event ID, occurrence of an event resulting from operation on the remote commander 7. In a case where the event ID is −1, occurrence of the event is prohibited, whereas in a case of a significant value other than −1, the event ID is sent to external equipment from which metadata DM will be sent back in reply, via an event EV. In this embodiment, in response to this event EV, the external equipment switches its operation to output metadata DM for display of the next menu screen, as necessary, and in order to simplify the series of processing in the external equipment, and further to facilitate understanding, the event ID corresponding to the event via which the next metadata DM is outputted is set to a value equal to the metadata ID of the next metadata DM. Thus, in the examples of FIGS. 6 and 7, in the first menu data DM1, it is defined that in a case where any of the Left, Right, Up, and Down keys 34 is pressed, and further, if either the Back key 33 or the Menu key 32 is pressed, no event occurs, whereas if the OK (ENTER OK) key is pressed, an event based on an event ID being a value 264 occurs. Similarly, in the next menu data D2, occurrence of an event based on an event ID being a value 265 is defined on condition that the OK key be pressed.

Thus, the metadata DM is generated by the control section 21 of each of the external equipment 3-6 such that a single menu screen is displayable. In this embodiment, menu screens based on the metadata DM are formed in a hierarchical structure so as to correspond to menu screens which will be displayed on the monitor or the television receiver of a conventional configuration when each of the external equipment 3-6 is connected to the monitor or the television receiver for output of its video data DV thereto. Hence, metadata DM on menu screens at different hierarchical levels are associated with each other through the corresponding event IDs recorded in event data, and it is accordingly set such that metadata DM corresponding to a lower-level menu screen, and further, an event corresponding to control over the operation of the various parts can be specified through notification of an event ID based on an event EV.

Here, a case is considered where the control section 21 records for holding the metadata DM in the built-in memory, and connected to the monitor or the television receiver of an existing configuration to display a menu screen thereon to form a graphical user interface. The control section 21 causes the GUI generation section 21B to generate the menu screen by using the metadata DM held in the memory, and further, causes the request processing section 21A to judge link data based on an event ID set in the metadata DM whereby to control the operation of the various parts, and still further, instructs the GUI generation section 21B to generate a next menu screen. Note that in this case, instead of directly recording the metadata DM itself, data may be used to generate and output the metadata, the data being menu screen generating data for generating a menu screen for displaying the menu screen when the external equipment is connected to the monitor or the television receiver having an existing configuration.

FIGS. 8 and 9 are representations each showing notification of events EV. Here, the events EV come in two types: direct events (FIG. 8) for direct transmission of operation on the remote commander 7 and key operation on the control panel of the system display 2, to external equipment, and high-level events (FIG. 9) by which user operation is interpreted by the system display 2, for transmission to the external equipment. In this embodiment, any user operation is sent to the corresponding one of the external equipment 3-6 from the system display 2 via a high-level event.

Note that a direct event is prepared by defining each key operation using an argument, for transmission, whereby in a case of notified of an event EV being a direct event, the external equipment 3-6 judge the key operation from the event EV received, and accordingly switches menu screens, operations, similarly to the ordinary case where they generate their graphical user interface using video data DV for output to the monitor or the like. Note that in this case, the switching of menu screens is executed by the external equipment sending metadata DM corresponding to its judgment result.

In a high-level event, the above-mentioned event ID set to each menu data of metadata DM is sent via a "MENU EVENT". Furthermore, an instruction for sending metadata on a later-described root menu is sent via an "INQUIRY ABOUT MENU". Furthermore, notification about selection change is given via "SCROLL" in each of the directions on the menu screen, page switching with "PREVIOUS PAGE" and "NEXT PAGE", or the like.

As shown in FIG. 10, the control requests RE are outputted from the control section 21 of each of the external equipment 3-6 when the external equipment controls the operation of the system display 2 through its operation. In the control requests RE, switching of display of the graphical user interface being a menu screen, switching of an input source, and the like are defined, whereby in this AV system 1, it is configured such that each of the external equipment 3-6 can take the initiative to switch video inputs to the system display 2, to execute audio control, timer control, and the like, on the basis of a control request RE.

Figure 11:
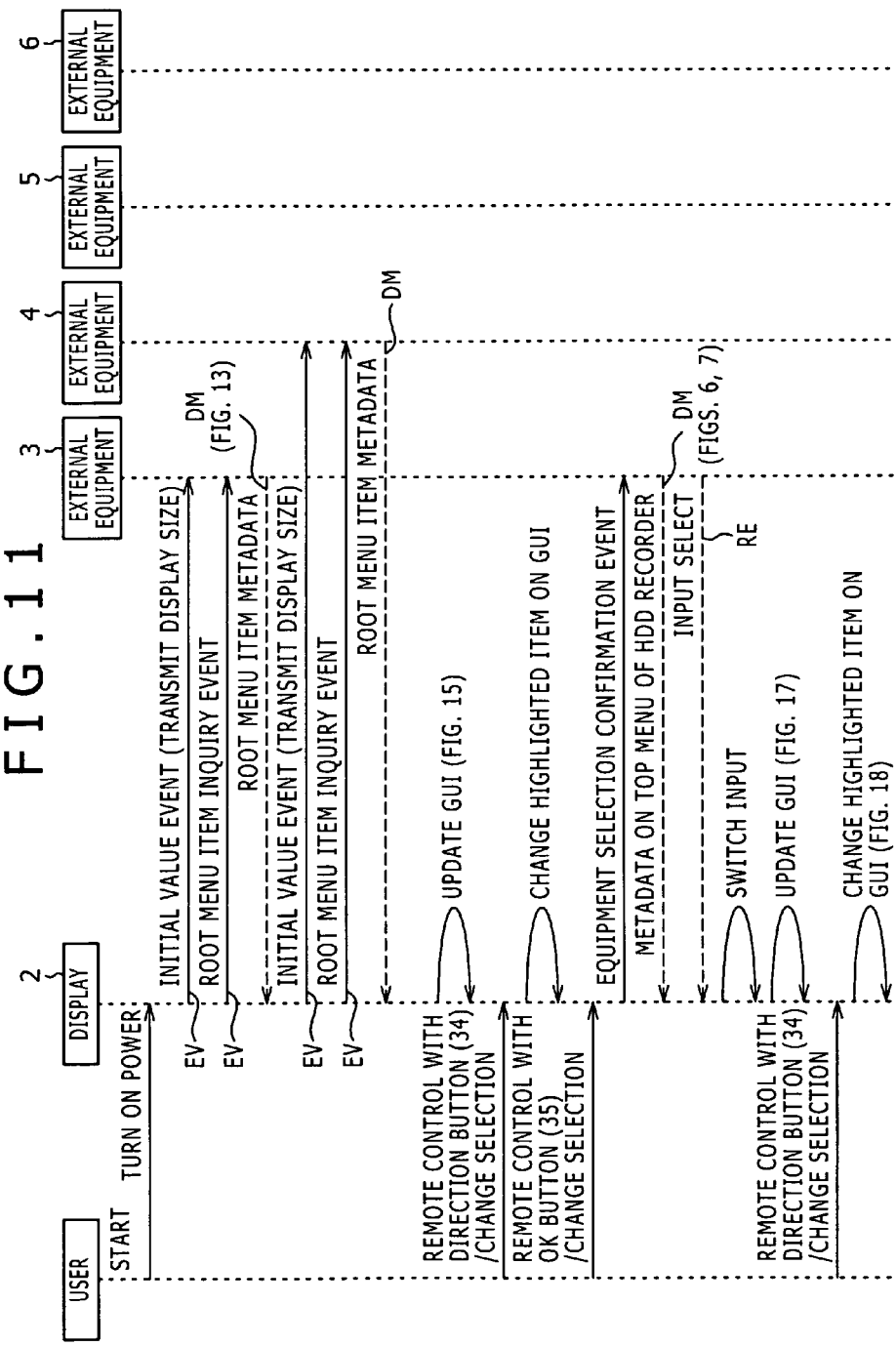
FIG. 11 is a sequence diagram for explaining the operation of the AV system of FIG. 1.
Figure 12:
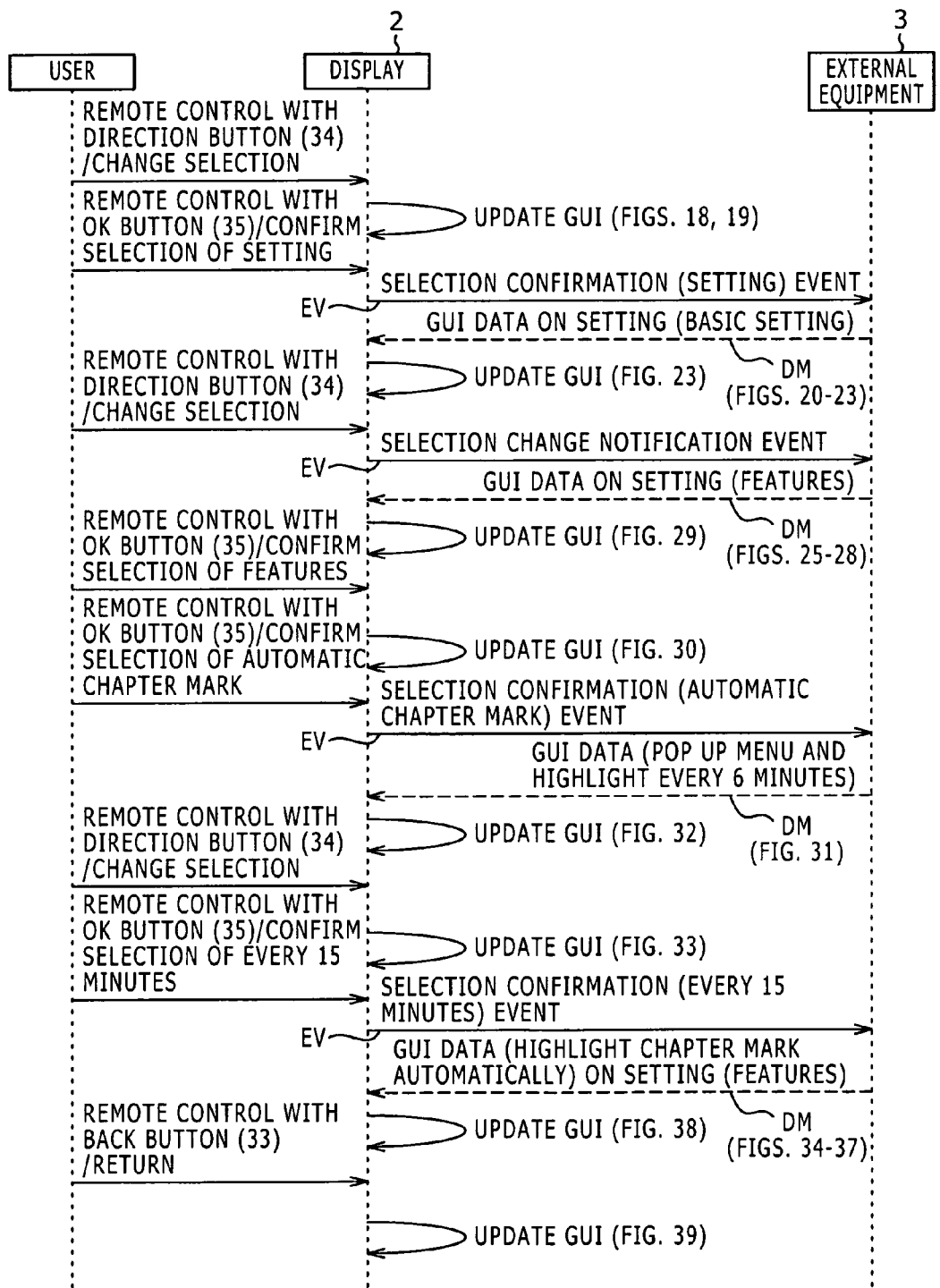
FIG. 12 is a sequence diagram continued from FIG. 11.

FIG. 1 is a flowchart showing a series of procedure executed by the control section 24 of the system display 2 and the control section 21 of each of the external equipment. FIGS. 11 and 12 are sequence diagrams respectively showing exchange of data by execution of this procedure of FIG. 1. Note here that in the following description, the external equipment 3-6 are a HDD recorder, a terrestrial digital broadcasting tuner, a DVD recorder, and a network server, respectively. Furthermore, in FIGS. 11 and 12, menu screens, metadata DM are denoted by the numerals given to the corresponding drawings, and also that key operation in the remote commander 7 is denoted by reference numerals given to the corresponding keys.

If the system display 2 has been turned on, the process by the control section 24 moves from step SP1 to step SP2, to notify single external equipment of an event ID for initialization which is set using a resolution, or the display size, of the system display 2 as an argument, via an event EV, whereby to notify the external equipment of the initialization of the processing for the graphical user interface, as well as of the resolution.

Then, in step SP3, the control section 24 notifies the external equipment of an event ID corresponding to a root menu via an event EV, thereby acquiring metadata DM corresponding to the root menu screen.

The process then moves to step SP4, judges whether or not the initialization and acquisition of the metadata DM on the root menu have been completed for all the external equipment connected to the system display 2. If the judgment result is negative, the process returns to step SP2 to instruct next external equipment to initialize, and to acquire metadata DM on the root menu of that next external equipment.

Thus, the control section 24 of the system display 2 repeats the process of steps SP2 and SP3 for as many external equipment as are connected thereto, to acquire the metadata DM on the root menu from the respective external equipment.

Figures 13, 14:
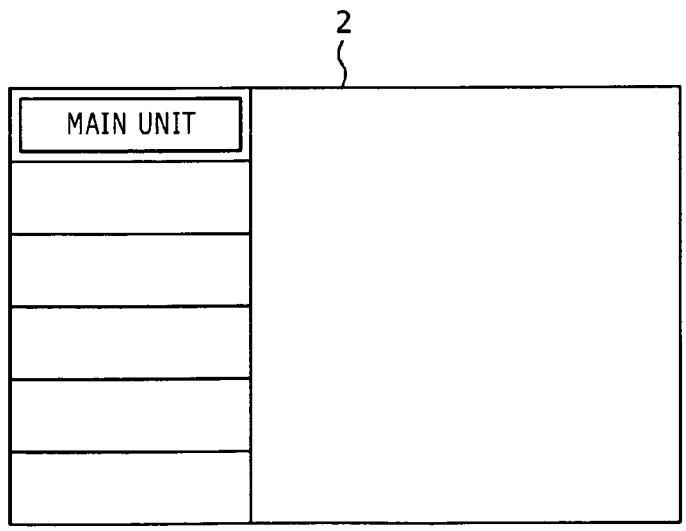
FIG. 13 is a representation of metadata on a root menu.
FIG. 14 is a plan view showing a screen of the root menu.

Here, the root menu means a menu used to select external equipment. As shown in FIG. 13 which gives an example of the external equipment 3 being a HDD recorder, only for the root menu, its metadata DM includes no menu data, and assigns therein the management data together with a title (PVR: Personal Video Recorder). Thus, the metadata DM on the root menu is processed to create a menu screen in which a menu item indicating the title recorded in that metadata DM is laid out, according to settings in the system display 2.

Thus, when having initialized all the external equipment and acquired the metadata DM on the root menu, the process by the control section 24 of the system display 2 moves from step SP4 to step SP5, to display a screen listing thereon the root menu items using the acquired metadata DM and the corresponding root menu-related data in the system display 2. Here, the control section 24 causes the skin generation section 28 to generate a skin set to the system display 2, causes the GUI component library 29 to select components and causes the GUI assembly section 30 to create each menu item, thereby displaying the menu screen using these menu items and skins. In this case, as to the metadata DM on the root menu, as mentioned above with reference to FIG. 13, due to none of the menu type, menu display position, size, and the like being recorded, the control section 24 of the system display 2 generates each of the menu items by a default set to the system display 2. Note that when the key 32 for instructing a main menu to be displayed is pressed, the control section 24 executes steps SP1-SP4 by skipping the initialization processing, thereby to acquire the metadata DM on the root menu from each of the external equipment, after which it executes step SP5.

Figures 15, 16:
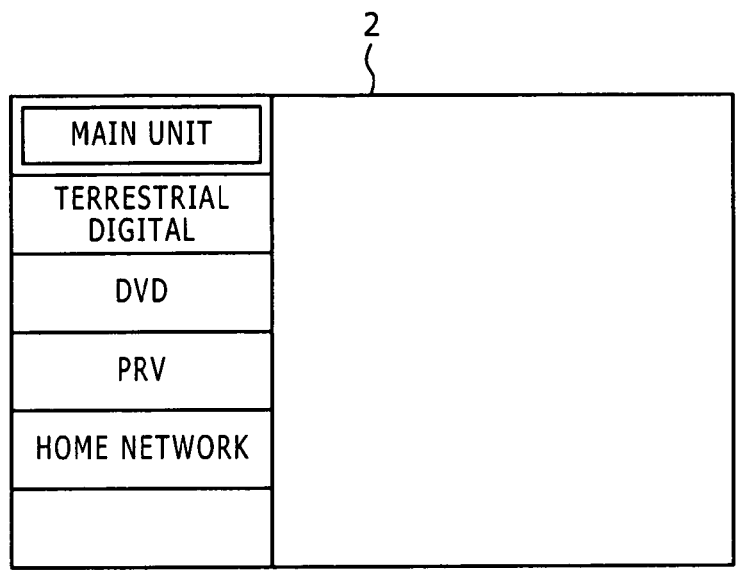
FIG. 15 is a plan view showing another example of the root menu.
FIG. 16 is a representation of metadata on an input switching request.

Now, FIG. 14 is a plan view showing a menu screen of the system display 2 in a case where none of the external equipment 3-6 is connected, and FIG. 15 is a plan view showing a menu screen in the system display 2 in a case where the tuner and the like are connected. Note that in this embodiment, a focused menu item is displayed at a higher luminance than other menu items. However, in the following drawings, this focus setting is shown by a box. The focus may otherwise be displayed by, e.g., adding borders.

Thus, after displaying the root menu, the control section 24 switches, in the following step SP6, the focus to one of its menu items in response to operation through the remote commander 7, and accepts selection of equipment by the OK key 35 having been pressed. Here, if the equipment selected by this user is the system display 2, the control section 24 controls the operation of the GUI component library 29 and the like using data which are similar to metadata, used to display menu screens, and held in the memory, not shown, thereby to sequentially display, e.g., menu screens on which to make various settings to the system display 2. Furthermore, the control section 24 detects operation effected by the remote commander 7 on these menu screens displayed, to control the operation of the various parts of the system display 2 itself.

On the other hand, if the equipment selected by this user is one of the external equipment, the control section 24 instructs the selected external equipment to send top menu-related metadata DM. Note that in this case, the control section 24 notifies the corresponding equipment of an event EV via a value 256 being an event ID specifying the top menu, thereby acquiring the metadata DM on the top menu.

Thus, the external equipment having been notified of this event EV causes its control section 21, in step SP7, to interpret the event ID set in the event EV received to send the corresponding metadata DM, and also instructs the system display 2 to switch inputs via a control request RE. According to the instruction received, the control section 24 of the system display 2 switches its input setting in the audio/video input section 13, to the corresponding external equipment. Note that in this case, as shown in FIG. 16, by expanding the function of metadata DM corresponding to display of menus, the metadata DM, instead of a control request RE, may be transmitted to instruct the system display 2 to switch the input setting in the system display 2. Still alternatively, the input switching may be made directly by the system display 2, without involving the external equipment. Thus, if the user selects the external equipment 3 being a HDD recorder, its control section 21 notifies the system display 2 of the top menu-related metadata DM mentioned above with reference to FIGS. 6 and 7.

Figure 17:
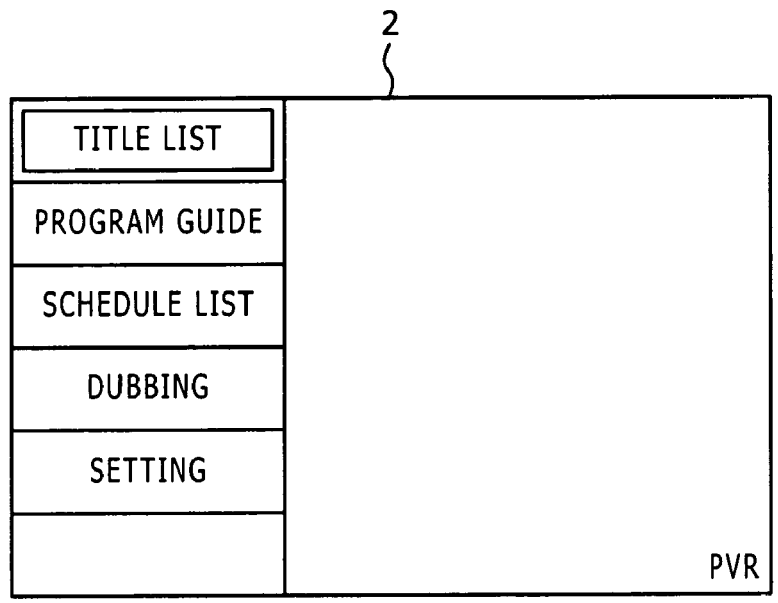
FIG. 17 is a plan view showing a screen of the top menu.

In the following step SP8, the control section 24 of the system display 2 displays the top menu according to the metadata DM acquired through the notification of this event EV. Here, the metadata DM corresponding to the top menu mentioned above with reference to FIGS. 6 and 7 assigns its menu data D1-D5 to display menu buttons indicating titles "TITLE LIST", "PROGRAM GUIDE", "SCHEDULE LIST", "DUBBING", and "SETTING", respectively. Thus, in this case, as shown in FIG. 17 for comparison with FIGS. 14 and 15, the control section 24 of the system display 2 displays the top menu listing the buttons to which these titles are set, according to the display position, size, visible/invisible and other settings set in the metadata DM.

Successively, the control section 24 of the system display 2 moves to step SP9, to receive operation from the remote commander 7 here, and then, in step SP10, judges whether or not this operation corresponds to what is displayed inside the menu screen, via a function block of the event control section 26. Here, the control section 24 searches for transition data as to the menu data corresponding to the currently focused menu item, through which to detect the menu ID corresponding to a key pressed on the remote commander 7. Furthermore, the control section 24 judges whether or not the detected menu ID is set to a significant value, i.e., a value other than −1.

When the judgment result is affirmative, the control section 24 moves from step SP10 to step SP11, to search for a menu ID set to each of the menu data in the metadata DM corresponding to this menu screen via the menu ID detected through the transition data, thereby detecting a focus transition destination. The control section 24 changes the focus according to the detection result, and the process returns to step SP9.

Thus, when the Down key 34 has been pressed several times, the control section 24 of the system display 2 switches the focus to lower-level menus (see FIG. 12) accordingly.

Furthermore, in step SP10, the control section 24 searches for event data corresponding to the currently focused menu item, through which to detect an event ID corresponding to a key pressed on the remote commander 7. Furthermore, the control section 24 judges whether or not the detected event ID is set to a significant value, i.e., to a value other than −1.

Also in this case, the process by the control section 24 moves from step SP10 to step SP11, to switch display according to what is recorded in the metadata DM, after which it returns to step SP9. Note that such processing includes switching of the focus to a submenu, as later described with reference to FIGS. 20-23.

Meanwhile, if the menu ID and the event ID detected by the transition data and the event data are not set to significant values, respectively, the process returns to step SP9 from step SP10, neglecting the control on the remote commander 7.

Figure 19:
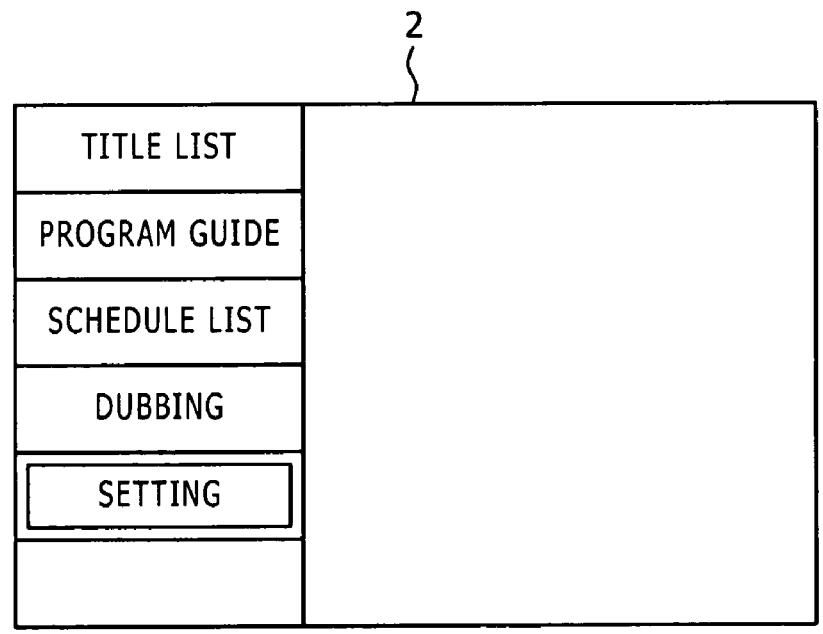
FIG. 19 is a plan view showing another example of focus transition in the top menu.

On the other hand, if the event ID set to a significant value has been detected through the searching for the event data, the process by the control section 24 moves from step SP10 to step SP12, to notify the external equipment corresponding to the menu currently displayed, of the detected event ID. Thus, in the following step SP13, the control section 21 of the corresponding external equipment prepares the metadata corresponding to a next menu screen, and thereafter, the control section 24 of the system display 2, returning to step SP7, acquires the metadata DM prepared. Thus, as shown in, e.g., FIG. 19, when the OK key 35 has been pressed in the remote commander 7 with the focus set on the "SETTING" menu button, the control section 24 of the system display 2 notifies the corresponding external equipment 3 of an event ID being a value 512. Then, the external equipment 3 interprets the event ID set in this event EV, and notifies the system display 2 of the metadata DM shown in FIGS. 20-23.

Here, in this metadata DM, a metadata ID being a value 512 is assigned to its management data DM1, and menu IDs being 512 through 517 are respectively set in sequence, whereby menu buttons named "BASIC SETTING", "SCREEN SETTING", "FEATURES", "OPTIONS", and "SIMPLE SETTING" are indicated in the menu data D1-D6, respectively, with these menu data D1-D6 described as grouped with a <GROUP> tag, to be a first group. In the menu data D1-D6 as the first group, transition data is set such that no focus transition occurs between these menus. Furthermore, "SELECTED" is set to indicate a state in which only the menu data D1 at the beginning has been selected. Furthermore, in the event data of these menu data D1-D6, event IDs being significant values are set so as to correspond to operation through the OK key 35, the Back key 33, as well as up/down operation effectable on the menu buttons displayed. Note that in order to simplify processing in the external equipment, and further to facilitate understanding, the event IDs corresponding to the up/down operation in this event data are set to the same values as the menu IDS to which the focus will be switched by these key operation. Thus, in the first menu data D1, registered is an event ID that is set to the same value as the menu ID of the next menu data D2 being the focus transition destination corresponding to Down key operation. Similarly, the event ID corresponding to operation with the Back key 33 is set to the metadata ID value (256) assigned to the last menu screen, whereas the ID corresponding to a focus transition destination resulting from operation with the OK key 35 is set to a menu ID value (768) for the corresponding submenu.

In this metadata DM, menu data D7-D12 are similarly grouped using the same tag, and thus, they are described as a second group. Here, the menu data D7-D12 are menu data corresponding to submenu items to be displayed when the menu data D1 of this metadata DM is selected, and menu IDS being values 768-773 are set thereto, respectively. Thus, there are set display of menu buttons named "TERRESTRIAL SETTING", "BS SETTING", "AREA NUMBER SETTING", "GUIDE CHANNEL SETTING", "PROGRAM GUIDE SETTING", and "TIME SETTING", respectively. Furthermore, in these menu data D7-D12, transition data is set such that the focus switches so as to correspond to operation with the Up/Down keys, and the menu ID of the menu data D1 is set so as to correspond to operation with the Back key, and further, no selection is made by default.

Thus, the control section 24 of the system display 2 displays, in this case, as shown in FIG. 24, a menu corresponding to this metadata DM, with the focus set on "BASIC SETTING" corresponding to the menu data D1 among the menu buttons named "BASIC SETTING", "SCREEN SETTING", "AUDIO SETTING", "FEATURES", "OPTIONS", and "SIMPLE SETTING" displayed. Furthermore, under this state, in response to operation with the OK key 35, the control section 24 switches the focus to "TERRESTRIAL SETTING" based on the menu data D7 being a first one of the submenu items belonging to the menu item "BASIC SETTING", and further switches the focus sequentially to the other submenu items in response to operation with the Up/Down keys 34.

Meanwhile, when the Down key 34 has been pressed, the control section 24, in this case, notifies the external equipment 3 of an event EV based on an event ID recorded in the menu data D1, to acquire the metadata DM based on this event ID. Here, as shown in FIGS. 25-28 taking, as an example, metadata DM acquired via the event ID corresponding to menu data D4 in the metadata DM of FIGS. 20-23, in the metadata DM acquired through the operation with the Down key 34 in this way, menu data D1-D6 as a first group and menu data D7-D12 as a second group are assigned, similarly to the case of the metadata DM (FIGS. 20-23) corresponding to the event ID of the menu data D1 at the beginning. Here, these menu data D1-D6 are set to the same settings except that "SELECTED" is set selectively to each of the menu data D1-D6 so as to correspond to the focus transition destination.

Thus, the system display 2 notifies the corresponding external equipment 3 of an event in response to Up/Down key operation, and acquires the corresponding metadata DM, whereby to switch the focus from one menu item to another corresponding to the menu data D1-D6, and further display a submenu in response to such focus switching.

In this case, the control section 24 of the system display sets the focus on the "FEATURES" menu button corresponding to the menu data D4 as shown in FIG. 29 for comparison with FIG. 24, to display a submenu based on the menu data in the second group corresponding to the "FEATURES" menu button. Furthermore, under this state, by operation with the OK key 35, the control section 24 switches the focus to the first submenu item as shown in FIG. 30. Furthermore, if the OK key 35 has been pressed with the focus set to the first submenu item in this way, the system display 2 notifies the external equipment of an event EV via an event ID of the event data corresponding to the currently focused submenu item.

Figure 32:
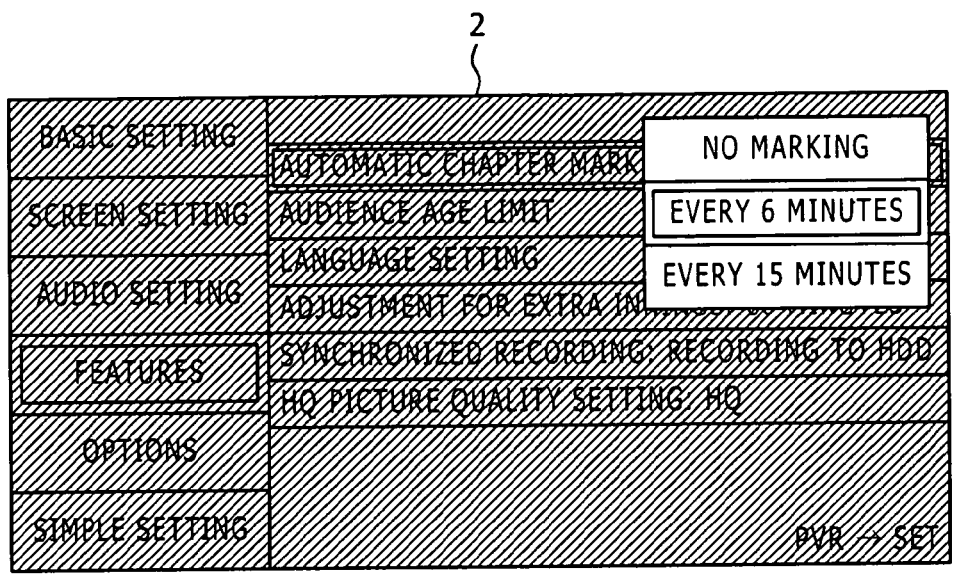
FIG. 32 is a plan view showing a menu screen based on the metadata of FIG. 31.
Figure 33:
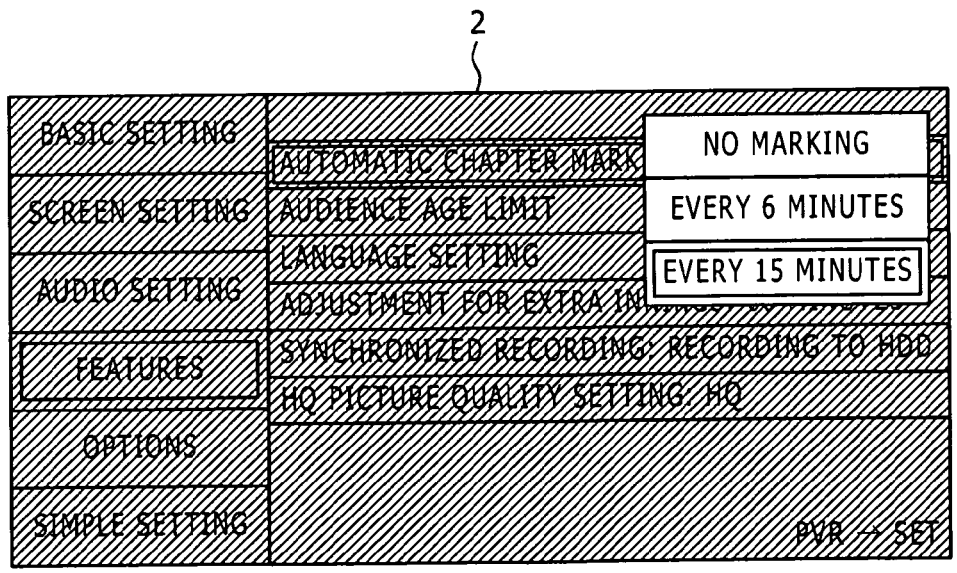
FIG. 33 is a plan view showing focus transition in the menu screen of FIG. 32.

FIG. 31 is a representation of metadata DM for selection of a single submenu item. Here, the metadata DM includes, in its management data DM1, a description that it is a pop-up menu (POPUP) and that a modal (Modal) is set so as to prohibit selection of the last menu displayed. Thus, as shown in FIGS. 32 and 33 for comparison with FIG. 30, the control section 24 of the system display 2 shadows the menu in the background.

Furthermore, in this metadata DM, the menu data D1-D3 are set such that menu commands named "NO MARKING", "EVERY 6 MINUTES", "EVERY 15 MINUTES" are displayed between which to switch the focus in response to operation with any of the Up/Down keys. Furthermore, event data is recorded so as to correspond to the OK and the Back keys 33, 35, respectively. Thus, in this case, when the OK key 35 has been pressed, the control section 24 of the system display 2 notifies the external equipment 3 of an event EV based on an event ID set to the event data, and the control section 21 of the external equipment 3, having been notified of this event ID, switches its operation to the instructed operation mode. Thus, as shown in FIG. 32, when the "EVERY 6 MINUTES" command has been selected from the submenu by the OK key 35 having been pressed, the control section 24 of the system display 2 notifies the external equipment 3 of an event EV based on an event ID being a value 841, and thus, the control section 21 of the external equipment 3, in turn, sets its entire operation such that chapters are set every 6 minutes after starting a recording. Furthermore, as shown in FIG. 33, when the "EVERY 15 MINUTES" command has been selected by the OK key having been pressed, the control section 21 of the external equipment 3 sets, in response to an event EV containing an event ID being a value 842 sent thereto from the system display 2, the entire operation of the equipment such that chapters are set every 15 minutes after starting a recording.

Furthermore, the control section 21 of the external equipment 3, after having set its operation in this way, newly sends metadata DM therein reflecting this operation setting, to the system display 2. In response thereto, because the menu display is a pop-up menu, if an event EV is notified by the operation of the OK key, the control section 24 of the system display 2 stop displaying the pop-up menu. Then, when having received metadata DM from the external equipment 3 as a reply to this event EV, the control section 24 displays a menu screen based on the metadata DM acquired from the external equipment 3.

Here, FIGS. 34-37 each are a representation of the metadata DM sent from the external equipment 3 in response to the notification of the event EV, when the submenu command for setting chapters every 15 minutes has been selected by the OK key 35 having been pressed. For comparison with FIGS. 25-28, in this case, part of the title in the menu data D7 is changed to "EVERY 15 MINUTES", whereby as shown in FIG. 38 for comparison with FIG. 30, the command in the "AUTOMATIC CHAPTER MARK" submenu is changed to the "EVERY 15 MINUTES", for display. Thus, in this case, when the Back key is pressed repeatedly, as shown in FIG. 39 for comparison with FIG. 38, the focus is switched to higher-level menu items, to go back as far as to the original menu screen step by step. Note that in this case, the focus switching may also be made to return to the initial root menu.

In this embodiment, focus transition and event notification take place exclusively from each other with respect to user operation. However, they may also coincide. For example, simultaneously with changing the focus between menu items on the system display side, an event may be sent to the equipment side, whereby the system display side may predict user operation and set the predicted user operation on standby, for example. Also, the equipment side may not only send new metadata to the system display side in response to the event, but may also start operation or processing on its own initiative. For example, the equipment side may start or stop playing a DVD according to the event.

In this embodiment, a plurality of types of image data for generating menus of different designs are available in the skin generation section 28 and GUI component library 29. The control section 24 displays the "SETTING" menu through user selection of the "MAIN UNIT" menu item described above with reference to FIG. 15, and further displays a submenu for accepting selection of any of these menu generating image data through user selection of "DESIGN" from among items listed in the "SETTING" menu. Then, the user selects one of the commands in the submenu, to switch the above-mentioned image data used to generate a menu screen.

Figures 40, 41:
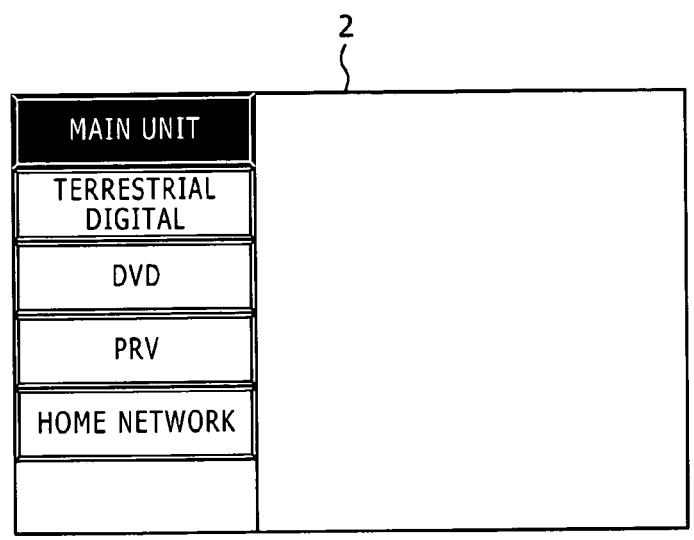
FIG. 40 is a plan view showing a menu screen based on another design.
FIG. 41 is a plan view showing a menu screen based on a design differing from that of FIG. 40.

Thus, the control section 24 changes the menu configuration on the menu screen as shown in FIGS. 40, 41 for comparison with FIGS. 15, 32, and further switches display of the menu whose selection has been prohibited, to display a menu screen customized by the user according to his/her taste.

(2) Operation of the Embodiment

In the above configuration, in this AV system 1 (FIGS. 1 and 3), if power is turned on in the system display 2, or if the Menu button 32 on the remote commander 7 of the system display 2 is pressed, the control section 24 of the system display 2 instructs initialization of the external equipment 3-6 connected thereto in sequence, after which the external equipment 3-6 notify the system display 2 of metadata DM on the root menu. On the basis of this metadata DM and the corresponding data in the system display 2, the root menu screen from which to select the external equipment 3-6 and the system display 2 is displayed on the system display 2 (FIGS. 1, 11, 12, 15). Furthermore, if the system display 2 has been selected by using its remote commander 7, a menu screen belonging to the system display 2 itself is displayed, accepting selection operation by the user.

Figure 18:
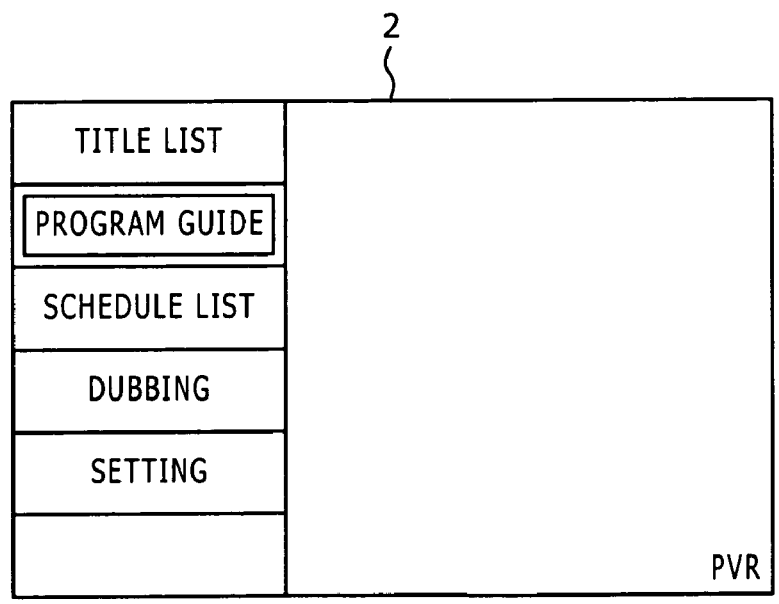
FIG. 18 is a plan view showing focus transition in the top menu.

If any of the external equipment 3-6 has been selected on the root menu, the control section 24 of the system display 2, in turn, notifies the selected one of the external equipment 3-6 of an event EV. Having received this event EV, the selected one of the external equipment 3-6 notifies the system display 2 of metadata DM on its top menu. In this AV system 1, this metadata DM includes data for defining a menu type, focus transition data and the like (FIGS. 6, 7), and on the basis of this metadata DM received, the system display 2 creates the top menu for display (FIG. 17). Furthermore, with respect to operation through the remote commander 7, the focus is switched between the top menu items according to the transition data (TRANSITION) defined in this metadata DM (FIGS. 18, 19), and when the OK key has been pressed, the system display 2 notifies the selected one of the external equipment 3-6 of that operation effected through the remote commander 7, via an event ID recorded in this metadata DM.

Furthermore, in response to this notification, the selected one of the external equipment 3-6 notifies the system display 2 of metadata DM on lower-level menu items than the top menu, and on the basis of this metadata DM, the system display 2 displays the lower-level menu items, accepting the selection operation by the user.

Thus, in this embodiment, external equipment transmits metadata defining therein at least a menu type and menu focus transition, to the system display, whereby the system display displays a menu screen, and further notifies the external equipment of what has been selected from the menu items displayed. As a result of this configuration, any of the external equipment 3-6 can be operated by only operating the remote commander 7 of the system display 2. Thus, the operation of the external equipment 3-6 can be switched without selectively using the remote commander 7 of the system display 2 and the remote commander of the external equipment 3-6. This can enhance the user-friendliness. Furthermore, any menu screen belonging to the external equipment 3-6 can be created by the system display 2 on the basis of metadata DM, whereby consistency in terms of operation and look in the graphical user interface can be achieved. This can also enhance the user-friendliness.

Thus, in this embodiment, by applying the embodiment to the AV system 1 for providing video content, the user-friendliness of the AV system 1 can be enhanced. Specifically, in this AV system 1, it is configured such that the system display 2 selectively inputs, via its audio/video input section 13, video data and audio data outputted from a plurality of external equipment 3-6 for display, whereby a menu based on metadata DM is displayed to switch the input data selected by the audio/video input section 13. Furthermore, the system display 2 notifies the external equipment of the selection of a menu item made, and thus in the system in which the plurality of external equipment 3-6 are connected thereto, the plurality of external equipment 3-6 can be operated via the remote commander 7 of the system display 2, whereby its user-friendliness can be enhanced. Furthermore, the plurality of external equipment 3-6 can share consistency in the operability and design of their graphical user interface. Still furthermore, even in expanding the AV system by connecting new external equipment thereto, such new external equipment can also be operated by the remote commander 7 of the system display 2, whereby consistency in the operability and design of the graphical user interface can be ensured, to ensure a higher expandability.

Thus, in the system display 2, the skin generation section 28, the GUI component library 29, and the GUI assembly section 30, all being the function blocks of the control section 24, create a menu screen by selectively using menu generating image data on the basis of metadata, whereby menus for operating these external equipment 3-6 can be displayed through a consistent design according to the menu generating image data.

Furthermore, a plurality of types of data are available as the menu generating image data, and image data for generating a menu can be switched according to user settings, whereby the user can customize menus so as to be consistent in design, and can operate a plurality of external equipment using such customized menus.

(3) Advantages of the Embodiment

According to the above configuration, external equipment transmits metadata for defining at least a menu type and focus transition, to the system display, whereby the system display displays a menu screen, and further notifies the external equipment of what has been selected from the menu items displayed. As a result of this configuration, the user-friendliness of the graphical user interface for the external equipment can be enhanced compared with that for the prior art equipment.

Furthermore, the external equipment is video equipment that outputs the video data of video content, and a menu screen is displayed on a display section for displaying the video data by this video equipment. Thus, by applying this configuration to a system for video content, the user-friendliness of the graphical user interface for the external equipment can be enhanced compared with that for the related art equipment.

Furthermore, a plurality pieces of such external equipment are made connectable, whereby video data outputted from these plurality pieces of external equipment are selectively displayed by selection from a menu screen. By applying this configuration to a system including a plurality of video content sources, consistency in the design and operation of the graphical user interface can be shared among the plurality pieces of external equipment as the sources, whereby the user-friendliness can be enhanced.

Furthermore, menu generating image data are selectively used to generate a menu screen on the basis of metadata, whereby the graphical user interface can be provided in any design available with the image data.

Furthermore, by providing a plurality of types of menu generating image data and selectively using them, the user can give consistency to the design of the graphical user interface as he/she desires, whereby design consistency in the graphical user interface can be achieved.

Embodiment 2

Note that the case where the external equipment is connected to the system display has been described in the above-mentioned embodiment. However, the present invention is not limited to this case, but may also be applicable extensively to, e.g., cases where external equipment is connected to electronic equipment of an incorporated type which is compatible with the system display.

Furthermore, the case where the system display gathers metadata to create a menu screen has been described in the above-mentioned embodiment. However, the present invention is not limited thereto. The function of creating a menu screen using metadata may be provided in any of the external equipment, and further in third equipment not used to output/display video content, such as a server.

Furthermore, the case where the external equipment is notified of operation performed on the remote commander via an event ID has been described in the above-mentioned embodiment. However, the present invention is not limited thereto. The external equipment can send operation effected on the remote commander in various ways, e.g., via an identifier code set to each operation key.

Furthermore, the case where metadata, and events, control requests are sent in predetermined formats has been described in the above-mentioned embodiment. However, the present invention is not limited thereto. These data may be transmitted in various formats.

Furthermore, the case where the system display notifies the external equipment of user selection operation, to acquire the corresponding metadata has been described in the above-mentioned embodiment. However, the present invention is not limited thereto. It may alternatively be configured such that the external equipment notifies the system display of a group of metadata, and the system displays caches such group of metadata for processing.

Furthermore, the case where the present invention is applied to an AV system of a home network type has been described in the above-mentioned embodiment. However, the present invention is not limited thereto, but may be applicable extensively to various systems such as audio systems for providing music content.

The present invention relates to electronic equipment, a system for video content, and a display method, and is applicable to cases where a system is constructed by connecting a monitor to various video equipment via, e.g., a home network.

According to the present invention, the user-friendliness of the graphical user interface for the external equipment can be enhanced compared with that for the conventional equipment.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic equipment comprising:
   a storage section that stores data for creating a menu screen;
   a metadata acquisition section that acquires metadata for displaying a menu item for operating external equipment, from the external equipment,
      wherein the metadata has data for defining at least a type of the menu item and transition data, and a menu ID which is a value unique to each menu item used to identify the menu item;
   a remote commander operation detection section that detects operation performed on a remote commander;
   a menu screen generation processing section that adds the menu item based on the metadata to the menu screen, for assembly; and
   a notification processing section that notifies the external equipment of the menu item selected on the menu screen, on the basis of a detection result of the remote commander operation detection section,
   wherein the transition data defines a transition destination of a menu focus according to the operation performed on the remote commander, and the transition destination of the menu focus is defined by the menu ID of each menu item, and
   wherein the menu screen generation processing section makes the menu focus transit on the basis of the metadata and the detection result of the remote commander operation detection section.

2. The electronic equipment according to claim 1, further comprising:
   a content data acquisition section that acquires data of content inputted from the external equipment; and
   a display section that displays the content;
   wherein the menu screen is displayed by the display section.

3. The electronic equipment according to claim 1, further comprising:
   a control section that controls switching of content inputted from a plurality pieces of the external equipment;
   wherein the metadata acquisition processing section acquires the metadata from each of the plurality pieces of the external equipment;
   the menu screen generation processing section generates at least an equipment selection menu screen for selecting the plurality of the external equipment, on the basis of the metadata acquired from each of the plurality of the external equipment;
   the notification processing section notifies the corresponding external equipment of a selected menu item, on the basis of the detection result of the remote commander operation detection section; and
   the control section switches to content inputted from the external equipment corresponding to the selected menu item, on the basis of the detection result of the remote commander operation detection section.

4. The electronic equipment according to claim 3, wherein:
   the menu screen generation processing section generates the menu screen by selectively using menu generating image data stored in the storage section, on the basis of the metadata.

5. The electronic equipment according to claim 4, wherein:
   the storage section has a plurality of types of the menu generating image data used to generate menus that look differently; and
   the menu screen generation processing section switches the menu generating image data used to generate the menu screen, using the plurality of types of the menu screen generating image data.

6. A system for video content in which video equipment that outputs video data of the video content is connected to electronic equipment having a display section, wherein:
   the electronic equipment has:
      a metadata acquisition section that acquires, from the video equipment, metadata for defining at least a type of a menu item and transition data, and a menu ID which is a value unique to each menu item used to identify the menu item;
      a remote commander operation detection section that detects operation performed on a remote commander;
      a menu screen generation section that generates video data used to display the menu screen by changing display of the menu item on the basis of the metadata and a detection result of the remote commander operation detection section; and
      a notification section that notifies the video equipment of selection of a menu in the menu screen, on the basis of the detection result of the remote commander operation detection section,
      wherein the transition data defines a transition destination of a menu focus according to the operation performed on the remote commander, and the transition destination of the menu focus is defined by the menu ID of each menu item, and the video equipment has:
- a video data output section that outputs the video data of the video content, to the electronic equipment;
- a metadata output section that outputs the metadata to the electronic equipment according to an instruction from the electronic equipment;
- a notification acquisition section that acquires notification about the selection of the menu; and
- a control section that instructs output of the metadata corresponding to a menu item whose hierarchical level follows that of the menu item corresponding to the metadata, according to the notification about the selection of the menu acquired by the notification acquisition section.

7. A method for displaying an operation menu for external equipment, comprising the steps of:
- acquiring metadata for defining at least a menu type and transition data, and a menu ID which is a value unique to each menu item used to identify the menu item, from the external equipment;
- detecting operation performed on a remote commander;
- generating video data used to display the menu screen by making the menu focus transit on the basis of the metadata and a detection result as to the operation performed on the remote commander; and
- notifying the external equipment of selection of a menu in the menu screen on the basis of the detection result as to the operation performed on the remote commander, wherein the transition data defines a transition destination of a menu focus according to the operation performed on the remote commander, and the transition destination of the menu focus is defined by the menu ID of each menu item.

8. An electronic equipment comprising:
an output section that outputs video content;
a metadata providing section that provides external equipment with metadata for displaying a menu item, wherein the metadata has at least a type of the menu item and transition data, and a menu ID which is a value unique to each menu item used to identify the menu item;
a notification acquisition section that acquires notification about the menu item having been selected; and
a control section that effects control to output video content corresponding to the selected menu item from the output section according to the notification acquired by the notification acquisition section,
wherein the transition data defines a transition destination of a menu focus according to operation performed on a remote commander, and the transition destination of the menu focus is defined by the menu ID of each menu item.

* * * * *